United States Patent
Osterweil et al.

(10) Patent No.: US 7,106,885 B2
(45) Date of Patent: Sep. 12, 2006

(54) METHOD AND APPARATUS FOR SUBJECT PHYSICAL POSITION AND SECURITY DETERMINATION

(75) Inventors: Josef Osterweil, Rockville, MD (US); Niels K. Winsor, Albuquerque, NM (US)

(73) Assignee: Carecord Technologies, Inc., Rockville, MD (US)

( * ) Notice: Subject to any disclaimer, the term of this patent is extended or adjusted under 35 U.S.C. 154(b) by 701 days.

(21) Appl. No.: 09/946,335

(22) Filed: Sep. 6, 2001

(65) Prior Publication Data

US 2002/0044682 A1    Apr. 18, 2002

Related U.S. Application Data

(60) Provisional application No. 60/231,226, filed on Sep. 8, 2000.

(51) Int. Cl.
*G06K 9/00*    (2006.01)

(52) U.S. Cl. .............. 382/103; 382/154; 340/573.7

(58) Field of Classification Search .......... 382/103, 382/154, 291, 104, 106; 340/573.1, 573.7, 340/573.2, 573.3, 573.4, 573.5, 573.6; 348/135, 348/136, 139, 143, 152, 153, 154, 155, 159
See application file for complete search history.

(56) References Cited

U.S. PATENT DOCUMENTS

| | | | | |
|---|---|---|---|---|
| 4,945,367 A | * | 7/1990 | Blackshear | 396/427 |
| 5,747,719 A | * | 5/1998 | Bottesch | 89/1.1 |
| 5,900,907 A | * | 5/1999 | Malloy et al. | 348/14.1 |
| 5,910,817 A | * | 6/1999 | Ohashi et al. | 348/159 |
| 5,937,092 A | * | 8/1999 | Wootton et al. | 382/192 |
| 6,002,427 A | * | 12/1999 | Kipust | 348/156 |
| 6,031,568 A | * | 2/2000 | Wakitani | 348/169 |
| 6,049,281 A | * | 4/2000 | Osterweil | 340/573.4 |
| 6,154,559 A | * | 11/2000 | Beardsley | 382/103 |
| 6,160,478 A | * | 12/2000 | Jacobsen et al. | 340/539.12 |
| 6,443,890 B1 | * | 9/2002 | Schulze et al. | 600/300 |
| 6,567,682 B1 | * | 5/2003 | Osterweil et al. | 600/407 |
| 6,690,411 B1 | * | 2/2004 | Naidoo et al. | 348/143 |
| 6,961,443 B1 | * | 11/2005 | Mahbub | 382/100 |
| 2001/0000025 A1 | * | 3/2001 | Darrell et al. | 382/103 |

FOREIGN PATENT DOCUMENTS

| | | | |
|---|---|---|---|
| JP | 08-150125 | * | 6/1996 |
| JP | 2000-207665 | * | 7/2000 |

OTHER PUBLICATIONS

Pages 9-4 to 9-19 of *Signal Processing Techniques*, by Russ Roberts, published by Interstate Electronics Corporation, 1979.

Pages 452 to 455 of *Methods Of Theoretical Physics*, by Philip M. Morse et al., published by McGraw-Hill, 1953.

Pages 104 to 109 of *Wavelets And Their Applications*, by Mary Beth Ruskai et al., published by Jones and Bartlett, 1992.

(Continued)

*Primary Examiner*—Jingge Wu
*Assistant Examiner*—Charles Kim

(57) ABSTRACT

Method and apparatus for analyzing an orientation of a subject. An image of an area that includes a subject to be monitored is captured, so that a model can be produced. A consistency test is then performed on the produced model to determine predetermined features of the subject. In response to a predetermined result of the consistency test, an undesired orientation of the subject is indicated.

28 Claims, 15 Drawing Sheets

OTHER PUBLICATIONS

Pages 27 to 33 of *Approximations For Digital Computers*, by Cecil Hastings, Jr., published by Princeton University Press, 1955.

Pages 94 to 103 of *An Introduction To Random Vibrations, Spectral and Wavelet Analysis, Third Edition*, by D. E. Newland, published by Longman Scientific & Technical, 1993.

* cited by examiner

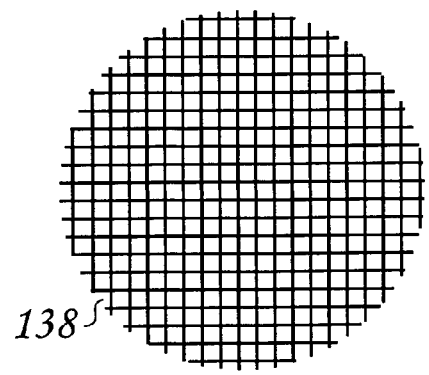
Fig. 6
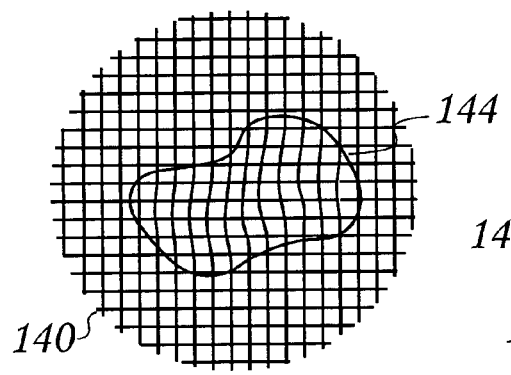 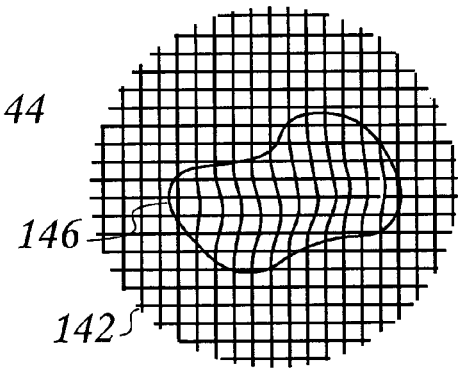
Fig. 7(a)　　　　　Fig. 7(b)

METHOD AND APPARATUS FOR SUBJECT PHYSICAL POSITION AND SECURITY DETERMINATION

CROSS-REFERENCE TO RELATED APPLICATIONS

The present application claims the benefit under 35 U.S.C. §119(e) of U.S. Provisional Application No. 60/231,226 filed on Sep. 8, 2000, the disclosure of which is expressly incorporated by reference herein in its entirety.

1. FIELD OF THE INVENTION

The present invention is directed to an apparatus and method for evaluating the physical positioning of subjects, such as, for example, people and/or animals, in a facility, such as, for example, a hospital, nursing home, person's residence, or the like. More specifically, the present invention relates to a system that analyzes images obtained of the facility and its contents to determine a physical orientation of the subject, in order to determine, for example, whether a condition requiring immediate attention exists.

2. BACKGROUND AND RELATED INFORMATION

Due to improved medical care, people are living longer lives. However, many people, regardless of age, are unable to care for themselves, and thus live, for example, in a nursing home or similar type institution. Other people, such as, for example, the aged, may find that it is difficult and/or no longer desirable to live alone, and thus, elect to live in, for example, an assisted living facility that provides their residents with assistance with certain daily tasks (such as, for example, bathing and dressing) and respond to requests for emergency assistance. Alternatively, such monitoring services may also be desirable in a home setting, when, for example, an individual lives alone but is afraid of being helpless should he/she fall.

In a typical assisted living or nursing home situation, a limited number of staff members are available to monitor a relatively large number of residents (or patients). Occasionally, an urgent need by one of the monitored individuals may arise that requires a rapid response. In the absence of that response, serious injury, or even death, may occur.

In a home setting, there are generally fewer individuals that need monitoring. In this situation, the individual to be monitored may retain an aid to assist with, for example, cooking, cleaning and performing routine house chores. Such an individual that is being monitored may, for example, fall while the aid is out shopping, and have to wait lying on the floor until the aid returns. Such a situation is not desirable.

In this regard, it is noted that phrases, such as, but not limited to, for example, staff, staff member, monitoring personnel, attending personnel, etc., refer to a person located on or off the premises (facility) where the individual (subject) is being monitored, and may include, for example, an emergency call service or a neighbor of the monitored individual.

SUMMARY OF THE INVENTION

Accordingly, there is a need to develop an automated system that identifies when a subject, such as, for example, a person, requires immediate attention. Furthermore, in the home setting, where only a limited number of individuals need to be monitored, it would be desirable to have the monitoring system additionally function as a security system that identifies intruders.

In both the home and the institutional setting, manual methods of summoning aid are available. Institutional settings typically feature "call bell" devices, and/or passive monitors. In contrast, the disclosed invention is a monitoring system that requires no action by the individual(s) being monitored. This is particularly important where, for example, the monitored individual may lose consciousness; a fall can render a signaling device unreachable; the individual, such as, for example, an Alzheimer's patient, is subject to confusion; the subject may have low vision and thus, be unable to find the signaling device; the subject such as an animal, is incapable of operating a signaling device; or in any case where many false alarms may otherwise be expected.

According to an object of the present invention, a method is disclosed for analyzing an orientation of a subject. An image of an area that includes a subject to be monitored is captured, by, for example, a stereoscopic sensor or a plurality of sensors, to produce a model. A consistency test is then performed on the produced model to determine predetermined features of the subject. An undesired orientation of the subject is indicated, by, for example, an alarm, in response to a predetermined result of the consistency test. The alarm may be interfaced to, for example, an existing alert system.

According to a feature of the present invention, a two dimensional model and/or a three dimensional model is produced.

According to another feature of the invention, an image of the area that includes an individual to be monitored is captured, and features related to the individual are analyzed to determine whether the individual is in the undesired orientation, such as, for example, being substantially horizontal. When the undesired orientation is detected, an alarm is issued.

According to an advantage of the invention, an image of an area is captured that includes an individual to be monitored, and a consistency test is performed on at least one of a two dimensional model and a three dimensional model to determine whether an orientation of the individual is substantially horizontal.

According to another feature of the invention, color information and/or texture information of the monitored subject is captured to derive a condition of the monitored subject.

A still further feature of the present invention is that a pattern generator may be used to project a distinctive marking into the area.

According to another object of the present invention, an apparatus for monitoring an orientation of a subject in a predetermined volume is disclosed, comprising an image capture device that captures an image of the predetermined volume, a processing device that processes the captured image, the image processing device producing a two dimensional model and/or a three dimensional model of the captured image, the image processing device analyzing the two dimensional model and/or three dimensional model for indications that the subject is in a substantially horizontal position, and a notification device that provides a notification when the processing device determines that the subject is substantially horizontal. The notification device and the processing device may be located in different locations.

According to a feature of the invention, the apparatus further comprises an audio capture device that captures sounds emitted by the subject. The processing device analyzes the emitted sounds to derive cues pertaining to a position of the subject. The cues are derived from a voice recognition of the emitted sounds and/or a voice stress analysis of the emitted sounds.

According to another feature of the invention, the processing device further comprises a database of derived parameters as a function of time. In addition, a reporting device provides at least one of a numerical and graphical report of a status of the subject as indicated by said derived parameters.

According to an advantage of the invention, the processing device analyzes past movements of the subject in the predetermined volume to anticipate the horizontal position of the subject.

Another advantage of the invention resides in the inclusion of a visual display device that provides a visual image of the subject when the notification device provides the notification that the subject is substantially horizontal. The visual display device and/or the notification device provides supplemental information related to the subject.

According to a still further advantage, the notification device provides an intruder notification when the processing device determines that a non-authorized subject has entered the predetermined area.

According to another object of the invention, a method is disclosed for monitoring an orientation of an subject in a predetermined volume. An image of the predetermined volume is captured. The captured image is processed to produce at least one of a two dimensional model and a three dimensional model of the captured image, which is then analyzed for indications that the subject is in a substantially horizontal position. When the subject is determined to be substantially horizontal, a notification is issued. Past movements of the subject in the volume may be analyzed to anticipate the horizontal position of the subject.

According to a feature of the invention, sounds emitted by the subject are captured and analyzed to derive cues pertaining to the position of the subject. The cues are derived from at least one of a voice recognition of the emitted sounds and a voice stress analysis of the emitted sounds.

According to another feature of the invention, a database of derived parameters as a function of time is maintained. The derived parameters are reported as at least one of a numerical and graphical report of a status of the subject.

According to an advantage of the invention, a visual image of the subject is provided when the subject is determined to be substantially horizontal. Further, a notification may be provided when a non-authorized subject is determined to have entered the predetermined volume.

BRIEF DESCRIPTION OF THE DRAWINGS

The foregoing and other objects, features and advantages of the invention will be apparent from the following more particular description of preferred embodiments, as illustrated in the accompanying drawings which are presented as a non-limiting example, in which reference characters refer to the same parts throughout the various views, and wherein:

FIG. 6 illustrates a grid form pattern projected by a pattern generator used with the capture device of the second example of FIG. 5;

FIGS. 7(a) and 7(b) represent left and right images, respectively, of a concave volume imaged with the second example of the capture device apparatus used with the present invention;

DETAILED DESCRIPTION OF THE INVENTION

The particulars shown herein are by way of example and for purposes of illustrative discussion of embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the present invention may be embodied in practice.

Figure 8:
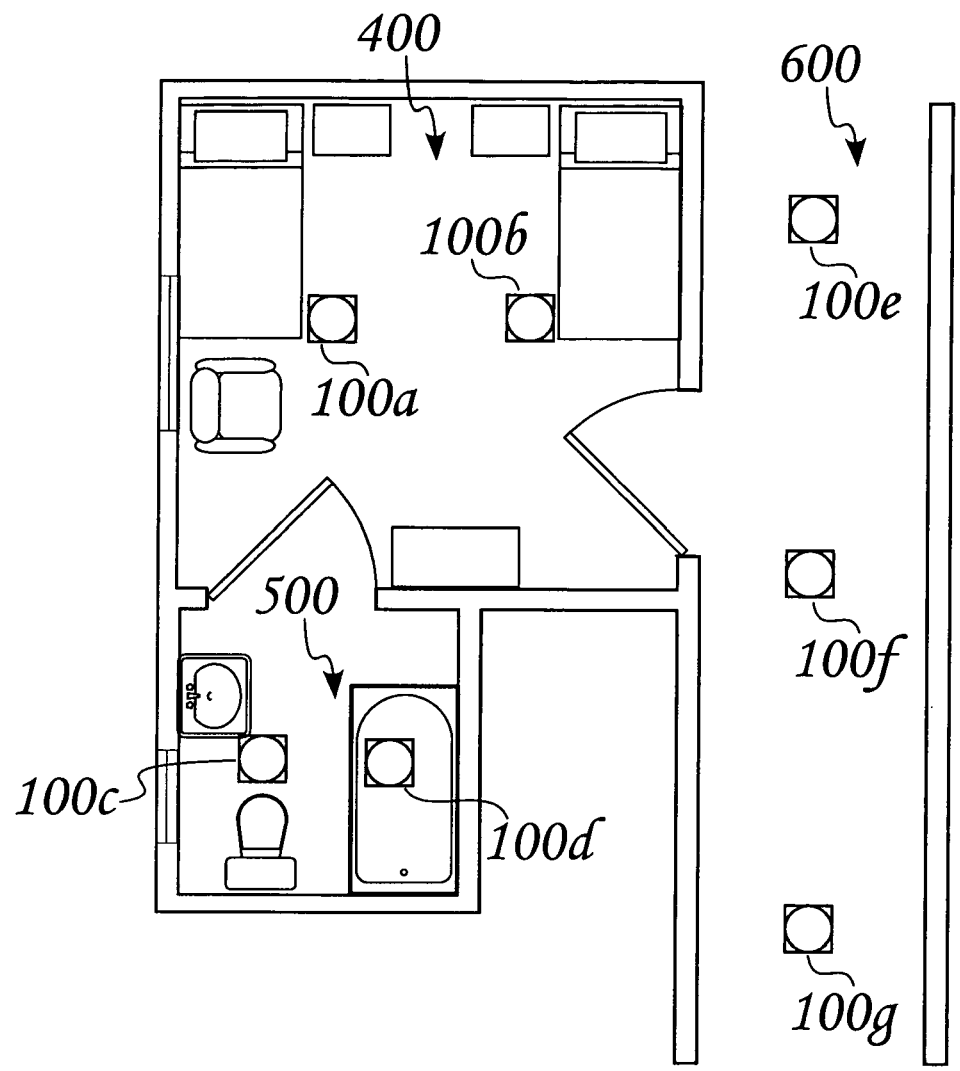
FIG. 8 illustrates an example of a placement arrangement of a plurality of capture devices used by the present invention to monitor a predetermined volume.

The present invention is based on a quantitative optical analysis of a monitored volume (i.e., visible region, such as, for example, a room and/or corridor—see FIG. 8) and the processing of the captured image to determine physical characteristics and other features of a monitored individual. In this regard, while the present invention will be described with respect to the monitoring of a single subject (such as, for example, an individual), it is understood that the instant invention is equally applicable to monitoring a plurality of subjects (which may be, for example, individuals and/or animals).

All available information, including monochromatic data, color data, three-dimensional data, previous image data and motion are used, either individually or in combination, to determine the condition of the monitored subject.

As employed in the following discussion, the term "volume" represents a three-dimensional region, such as, for example, the interior of a room. Any location within the volume can be uniquely identified by three numbers (x, y, z) referenced to a coordinate system. Each location in the volume is "monitored" if at least one capture device (to be discussed below) has an unobstructed view of the location.

In one embodiment, two sensors, such as cameras, are employed to "see" (capture) all significant parts of the volume in which the subject resides that are to be monitored. If the two sensors can not be positioned so that they "see" all significant parts of the volume in which the subject resides, more sensors are added. If possible, obstructions (i.e., chairs, dressers, bookcases, etc.) which interfere with the sensor's viewing (monitoring) are moved (re-located) in order to improve system performance and/or reduce the need for additional sensors.

At least two images are captured using the sensors positioned at locations that are far enough apart to provide a stereoscopic imaging of the monitored region. The present invention is quite flexible, in that, for example, a single imaging device with a split-image attachment, such as, but not limited to, for example, a periscope, may be used in place of plural sensors to provide a stereoscopic view of the monitored region. An advantage of using a single sensor is that less data-processing is required. However, ambiguous cases may arise when a single sensor is employed, resulting in the system concluding, for example, that the subject has fallen, when this is not the case. Accordingly, one should expect a single sensor arrangement to produce more false alarms in comparison with a plural sensor arrangement.

In this regard, it is noted that normal activity in the monitored volume may result in a temporary obstruction of at least some sensors, leading to circumstances in which the system has an unobstructed view of the subject in just one sensor. Thus, even when plural sensors are employed, there will be circumstances where an analysis will have to be performed using only data from a single sensor. One skilled in the art will recognize that a number of alternatives, such as, for example, an imaging device that moves on a rail (akin to synthetic aperture radar), or panning, can be used to provide comparable data for stereoscopic and other advanced image analyses.

The above-mentioned image-capture approaches (i.e., single image capturing, stereoscopic, and multi-image swath) provide accurate color information. Optionally, a controlled light environment may be provided using an artificial light source, such as provided by, for example, an incandescent lamp. All approaches will capture texture information (e.g., features that are visible in a black-and-white image that are independent of the color information). The single image capture will be the least effective (e.g., provide the least amount of texture information), while the multi-image swath will provide the greatest amount of texture information. However, it is understood that the approach is not limited to a particular camera type or spectral range. For example, a digital still camera, video camera, or other electrical or optical recording means will obtain (provide) required information for subsequent processing. In this regard, digital cameras have the benefit of providing digital data of a captured image that is immediately ready for computer processing and interpretation.

Figure 1:
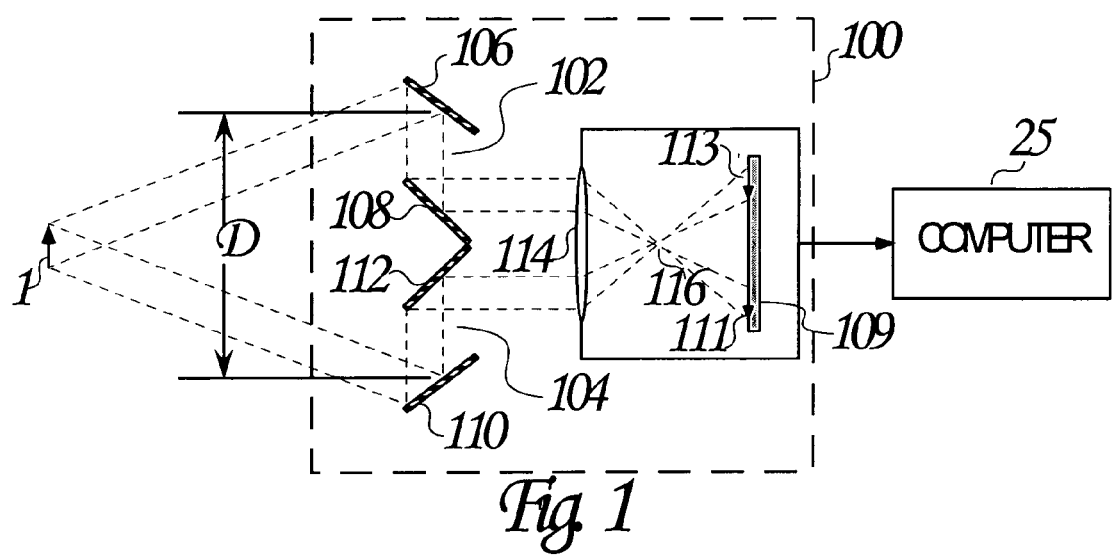
FIG. 1 illustrates an example of a stereoscopic capture device 100 used with the present invention to determine an orientation of a subject.

FIG. 1 illustrates an example of a sensor that is useable with the present invention. As shown in FIG. 1, a stereoscopic capture device 100, such as, but not limited to an electronic or digital camera (sensor), is employed to capture space diverse views of an object, such as, but not limited to, for example, an individual 1. In the embodiment of FIG. 1, the camera 100 includes an upper periscope 102 and a lower periscope 104. In this regard, while a limited number of camera setups will be described herein, it is understood that other (non-disclosed) setups may be equally acceptable and are not precluded by the present invention.

While the disclosed embodiment utilizes a single camera having two (or more) periscopes for capturing two (or more) images on a split frame, it is understood that a similar effect can be obtained by a camera (sensor or capture device) that has one periscope to capture one image on one-half of the fame and a second image that is directly captured by the camera on a second-half of the frame.

Referring to FIG. 1, the upper periscope 102 comprises an outer mirror 106 and an inner mirror 108 that direct a first light ray received from the subject (e.g., individual) 1 towards a first location of a focal plane of the camera 100, where, for example, a sensor 109 is positioned to detect a first image 111. Similarly, the lower periscope 104 comprises an outer mirror 110 and an inner mirror 112 that direct a second light ray received from the subject 1 towards a second location of the focal plane of the camera 100 where the sensor 109 is positioned to detect a second image 113.

In the disclosed embodiment, the sensor 109 comprises a charge couple device (CCD) sensor. Such sensors are well know to those skilled in the art, and thus, a discussion of their construction is omitted herein. In the disclosed embodiments, the CCD sensor comprises, for example, a two-dimensional scanning line sensor or matrix sensor. However, it is understood that other types of sensors may be employed without departing from the scope and/or spirit of the instant invention. In addition, it is understood that the present invention is not limited to the particular camera construction or type described herein. For example, a digital still camera, a video camera, a camcorder, or any other electrical, optical, acoustical or chemical recording means that records (collects) the required information for subsequent processing may be used. In this regard, digital cameras have the advantage of capturing images that are immediately ready for processing, whereas, for example, a film camera requires development of the film and scanning of the image recorded by the film before processing can begin.

Further, it is understood that the image (or images) captured by the camera can be processed (to be described below) substantially "in real time" (e.g., at the time of capturing the image(s)), or stored in, for example, a memory, for processing at a later time and/or at a location remote from the camera, without departing from the spirit and/or scope of the invention.

A location of the outer mirrors 106 and 110 relative to the subject 1, and in particular, a distance D between the outer mirrors 106 and 110 determines the effectiveness of a stereoscopic analysis of the subject 1. The outer mirrors 106 and 110 operate to reflect light rays arriving from the subject 1 towards the inner mirrors 108 and 112. The inner mirrors 108 and 112 operate to reflect the light rays toward a lens 114 of the camera 100. For purpose of illustration, dotted lines in FIG. 1 depict the optical path of the light rays from subject 1 to the first and second locations on the sensor 109. Since the upper and lower periscopes 102 and 104 provide for the capturing of a stereoscopic image, two distinct images fall upon the camera lens 114. The light rays pass through the camera lens 114, converge at a focus point 116 and eventually impinge the focal plane of the camera 100 where the sensor 109 is positioned.

Note that the two images 111 and 113 are inverted with respect to the subject 1. It is further noted that in place of the camera 100 and periscopes 102 and 104, two cameras may be used without departing from the scope and/or spirit of the present invention. In such a situation, each camera may be positioned, for example, at the locations depicted by the outer mirrors 106 and 110 in FIG. 1, so that a lens associated with each camera is spaced apart by the distance D. In this setup, each camera has its own sensor to capture an image. This differs from the embodiment shown in FIG. 1, in which the periscopes 102 and 104 operate to deliver two images to a single image frame.

Each image captured by the camera 100 (by the single sensor when the two periscopes are employed, or by two sensors when two cameras are used) are converted to electrical signals having a format that can be utilized by an appropriate image processing device (e.g., a computer 25 executing an appropriate image processing routine), so as to, for example, process the captured image, analyze data associated with the captured image, and produce a report related to the analysis.

Figure 2A:
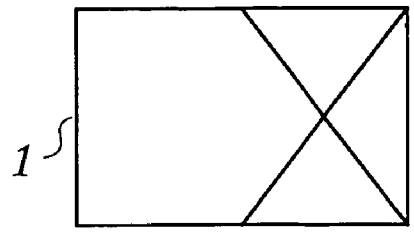
FIGS. 2(a) to 2(g) illustrate optical image transformations produced by the stereoscopic capture device of FIG. 1.

FIGS. 2(a) to 2(g) illustrate optical image transformations produced by the stereoscopic camera 100 of FIG. 1, as well as initial image normalization in the electronic domain. In FIG. 2(a), subject 1 is illustrated as a rectangle with an "X" marking its right half The marking helps in recognizing the orientation of images. Subject 1 is in a parallel plane to the camera's focal plane, and faces the camera of FIG. 1. For convenience, the following discussion of FIGS. 2(b) to 2(g) will refer to "right" and "left", instead of "upper" and "lower" as was the case in FIG. 1. However, it is understood that use of the terminology such as, for example, "left", "right", "upper" and "lower" is simply used to differentiate between plural images produced by the stereoscopic camera 100.

Figure 2B:
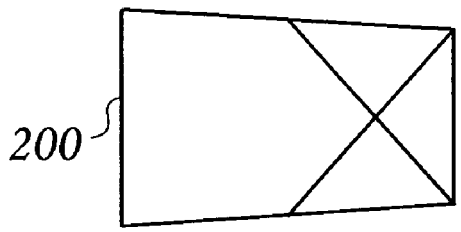

FIG. 2(b) represents an image 200 of the subject 1 as seen through a left periscope section (corresponding to, for example, upper periscope 102 of the stereoscopic camera 100 in FIG. 1), showing a perspective distortion (e.g., trapezoidal distortion) of the image and maintaining the same orientation ("X" marking on the right half as on the subject 1 itself).

Figure 2C:
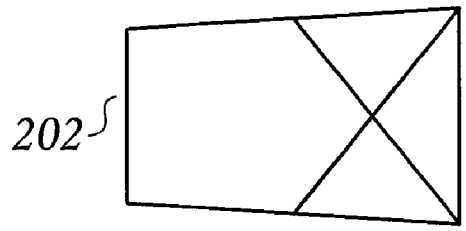

FIG. 2(c) represents an image 202 of the object 1 as seen through a right periscope section (corresponding to, for example, the lower periscope of the stereoscopic camera 100 in FIG. 1) showing a perspective distortion (e.g., trapezoidal distortion) and maintaining the original orientation ("X" marking on the right half as on the object 1 itself).

Figure 2D:
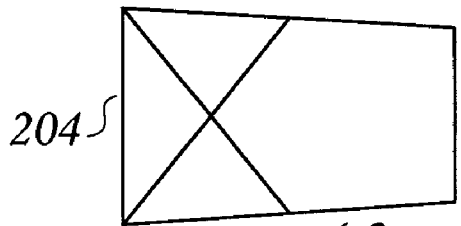

FIG. 2(d) represents an image 204 of an object projection on the left side of the camera's focal plane sensor 109 through the right periscope section. As shown in FIG. 2(d), the orientation of image 204 is inverted (e.g., the "X" marking is located on the left side), but the perspective distortion is maintained. It is noted that image 202 on the right side (FIG. 2(c)) arrived as image 204 on the left side.

Figure 2E:
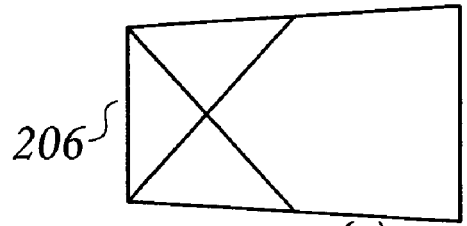

Similarly, image 206 (FIG. 2(e)) illustrates the object projection on the right side of the camera's focal plane sensor 109 through the left periscope section. Image 206 has been inverted (e.g., the "X" marking is located on the left side), but the perspective distortion is maintained. Also note that image 200 on the left side arrived as image 206 on the right side.

It is noted that in addition to the perspective distortion, additional distortions (not illustrated) may additionally occur as a result of, but not limited to, for example, a misalignment of the optical elements, and/or an imperfection in the optical elements, and/or an imperfection in the camera's sensor 109. The images 204 and 206 must be restored to minimize the distortion effects within the resolution capabilities of the camera's sensor 109. The image restoration is done in the electronic and software domains by the computer 25.

In the present invention, a database is employed to maintain a record of the distortion shift for each pixel of the sensor 109. This database is created at the time of manufacture of the camera 100, when the camera is initially calibrated, and is updated each time periodic maintenance of the camera 100 is performed. The information stored in the database is used to perform a restoration process of the two images, as will be described below. This database may be stored, for example, in the computer 25 used with the camera 100, or in a memory of the camera 100.

Figure 2F:
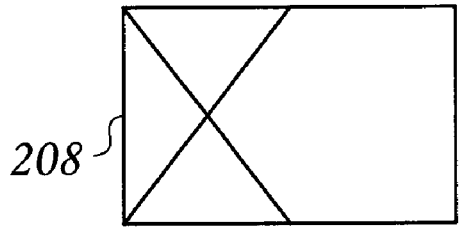

Image 208 in FIG. 2(f) represents a restored version of image 204, derived from the left side of the camera's focal plane sensor 109, which includes a correction for the above-noted perspective distortion. Similarly, image 210 in FIG. 2(g) represents a restored version of image 206, derived from the right side of the camera's focal plane sensor 109, which includes a correction for the above-noted perspective distortion.

Figure 3:
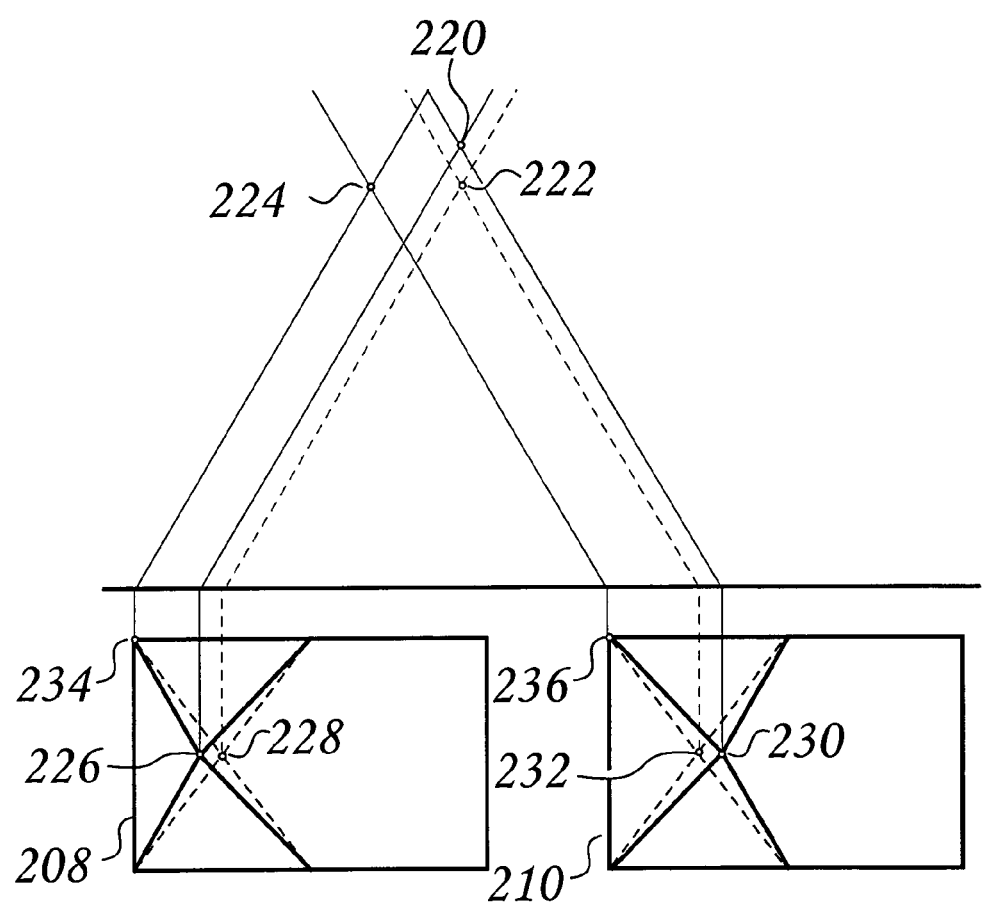
FIG. 3 illustrates an example of a stereoscopic process for a three-dimensional mapping to determine the location of each recognizable landmark on both left and right images produced by the capture device of FIG. 1.

FIG. 3 illustrates an example of a stereoscopic process for three-dimensional mapping to determine the location of each recognizable landmark on both left and right images, and to calculate the three dimensional locations of the landmarks and the distance between them. As shown in FIG. 3, the viewing angle of both the right and left sensor (capture device) is used to perform triangulation.

In order to simplify the following discussion, an explanation is set forth with respect to three points of a concave pyramid (not shown); a tip 220 of the pyramid, a projection 222 of the tip 220 on a base of the pyramid perpendicular to the base, and a corner 224 of the base of the pyramid. The tip 220 points away from the camera (not shown), while the base is in a plane parallel to the focal plane of the camera.

Figure 2G:
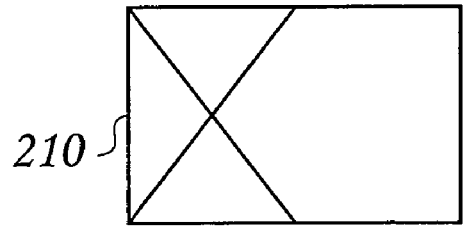

Flat image 208 of FIG. 2(f) and flat image 210 of FIG. 2(g) are shown in FIG. 3 by dotted lines for the object, described earlier, and by solid lines for the stereoscopic images of the three-dimensional object that includes the pyramid. FIG. 3 illustrates the geometrical relationship between the stereoscopic images 208 and 210 of the pyramid and the three-dimensional pyramid defined by the tip 220, its projection 222 on the base, and the corner 224 of the base. It is noted that a first image point 226 corresponding to tip 220 of the pyramid is shifted with respect to a left 228 of the flat object corresponding to the projection 222 of the tip 220. Similarly, a second image point 230 corresponding to the tip 220 of the pyramid is shifted with respect to a right 232 of the flat object corresponding to the projection 222 of the tip 220. The image points 234 and 236 corresponding to the corner 224 of the base of the pyramid are not shifted because the corner is part of the pyramid's base and in a plane, parallel to the focal plane of the camera, as is the flat object.

The first point 222 of the tip 220 on the base is derived as a cross-section between lines starting at projected points 228 and 232, and is inclined at an angle, as viewed by the outer mirror 106 of the upper periscope 102 and outer mirror 110 of the lower periscope 104. In the same manner, the tip 220 is determined from points 226 and 230, whereas a corner point 224 is derived from points 234 and 236. Note that points 224 and 222 are on a horizontal line that represent a plane of the pyramid base. It is further noted that point 220 is above the horizontal line, indicating a location outside the pyramid base plane on a distant side relative to the camera. The process of mapping the three-dimensional object is performed in accordance with rules implemented by a computer algorithm executed by the computer 25.

Reading color is an inherent feature of a color camera. Texture can be determined by a three-dimensional mapping of the surfaces within the monitored area. The degree of texture definition is determined by the capture device's resolution of the three-dimensional mapping. Texture that is finer than the resolution of the capture device cannot be registered by the system.

A standard color video camera can provide a raster image of a predetermined resolution (such as, for example, 640× 480 pixels) to a computer. Each pixel is represented by three numbers (for example, between 0 and 255, inclusive), one each for the red, green and blue content of that pixel in the (two-dimensional) image that the camera "sees." For example, suppose the subject is wearing white clothing and has red hair. The pixels recording the location of the hair would have a high red number and low green and blue numbers. The pixels recording the white clothing would have high blue, red and green numbers. Therefore, the location of the subject's head would be identified by observing the high red, and low green and blue numbers in the pixels corresponding to the hair seen in the cameras. From stereoscopic comparisons of these regions in two (or more) cameras, it can be determined whether the head is at a normal height, or near a floor.

In this regard, it is noted that when a single capture device (camera) is employed, the head could appear to be in the same position, illuminating the same pixels, while it may be at a normal height if it is near the camera, or on the floor if it is far from the camera. The image of the head in another camera is needed to resolve this ambiguity.

Texture, as distinct from color, is determined by noting differences among adjacent pixels and recognizing a regular pattern (for example in a plaid design, the pixel configuration may be, for example, a high red, a low red, a high red, a low red, etc.). Additional computing power is required to look for such patterns. In this regard, if a black-and-white camera is employed instead of a color camera, it may be necessary to look for such patterns to uniquely identify parts of the subject.

The following discussion is directed to one example of a fall detection algorithm using three-dimensional mapping of the monitored area to determine whether a person needs assistance. This algorithm can identify a featureless subject within a certain range of dimensional limits (of a human body), which, when interpreted as being at a position not higher than one and a half to two feet, is interpreted to represent a fallen subject. Further refinement of the algorithm provides analyses of the 3D image for straight lines, which is an indication of a man-made object, instead of a fallen subject.

Since the objective is to alert the staff personnel that a subject (individual) may have fallen, the staff can verify a fall by, for example, going to the site or viewing the site on a monitor. What is important in a fall situation is that the fallen individual receives prompt attention. In this regard, while it is desirable to have a system that produces as few false alarms as possible, it is better to use a system that occasionally produces false alarms, as opposed to a system that misses an actual fall condition. For example, the algorithm to be described below may inadvertently conclude that a mid-sized laundry bag on the floor is a fallen individual, and activate an alarm. The staff can easily determine whether an actual fall situation exists. It is noted that as the capture devices are improved and/or more powerful processing devices are developed, the algorithm can be improved so as to reduce (if not eliminate) instances of false alarms without departing from the scope and/or spirit of the present invention.

In the case of residential users, the alarm may be conveyed to an emergency response service, or other parties using, for example, an audial telephone communications system. Additionally, the resident (subject) may be given the option of resetting the alarm when a false alarm has been initiated. An audible signal may also be provided to alert the subject that the alarm has been activated.

It is noted that the subject may be monitored by an entity, such as, but not limited to, for example, an emergency response center, that is located at a site remote from the location of the subject. In such a situation, a two-way communications system is incorporated into the monitoring system, so that the monitoring personnel (staff) can communicate with the subject to determine whether the alarm is a false alarm. In the present invention, the two-way communications system operates without any user (subject) intervention (i.e., need to pick up a telephone, press a switch on a call pendent, etc.) when the alarm is activated. However, other types of communications systems may be used without departing from the spirit and/or scope of the invention.

According to the present invention, determining whether the individual 1 is on the floor is performed by identifying a feature on the individual's face and waist, and using the location of those features in at least two cameras to determine if all three parts of the person are, for example, less than two feet in height off the floor. In this regard, it is understood that other (or additional) features of the individual may be used without departing from the scope and/or spirit of the invention.

Features are identified by correlation (or comparison) with previous images of the individual. For example, assume the individual's mouth, belt buckle, and tip of the left foot are selected. If a black-and-white camera is used as the capture device 100, Fourier or wavelet transforms and correlation can identify features associated with specific body parts.

Correlation identification is disclosed in, for example, pages 9–5 et seq. of *Signal Processing Techniques*, by Russ Roberts (Interstate Electronics Corp., 1979). Fourier transforms are disclosed in, for example, pages 452 et seq. of *Methods of Theoretical Physics*, by Philip M. Morse et al. (McGraw-Hill, 1953). Wavelet transforms are disclosed in, for example, pages 105 et seq. of *Wavelets and their Applications*, by Mary Beth Ruskai et al.(Jones and Bartlett, 1952).

When the same feature is identified in any two cameras, the system uniquely determines the three-dimensional location of that feature, such as, for example, the body part containing that feature. If the identified features are all less than a predetermined distance, such as, for example, two feet, above the floor; the system concludes that a fall has occurred, and summons help, by, for example, activating an alarm, such as, but not limited to, for example, a bell, a spoken recorded message, a predetermined message that is sent to a pager, or other personnel-alerting device.

Further, the present invention provides for the escalation of the alarm if the staff fails to respond to the initial alarm within a prescribed time period (such as, but not limited to, for example, 5 minutes). For example, when an initial alarm is issued, a higher level alarm (which may be, but is not limited to, for example, alerting the supervisor of the staff and/or placing a call to 911 for emergency help) may be issued if the staff fails to acknowledge that he/she attended to the initial alarm condition within the prescribed time period.

In the disclosed invention, identification of a feature is performed in accordance with one of two methods. According to the first method, when the distance from the subject to the cameras (sensors) is large compared to the distance between the cameras, feature identification is performed using a method similar to a "human stereoscopic vision" model. That is, the system performs a "correlation" process to identify features that are common to both images. A comparison of the pixel locations in both images determines the three-dimensional position of the feature in the monitored volume. If it is determined to be a feature of the subject, it is analyzed for any relation to a fall or other event.

The "human stereoscopic vision" model exhibits limitations when the distance to the subject is comparable to, or shorter than the distance between cameras. For example a camera that captures an image of, for example, an individual's mouth, from the front will produce a different image from another camera that captures a side profile. In this example, the first camera will see the full width of the mouth, while the other camera will see only half of the width of the mouth, and at an angle that makes it appear much smaller than it actually is.

Accordingly, in this situation, the second method is employed, which is based upon a "feature identification" model, in which, for example, the color, shape and position of the mouth relative to other features is identified. After the feature identification model is used, the position of the feature in the cameras is used to determine the three-dimensional location of that part of the subject in the monitored volume.

Figure 4:
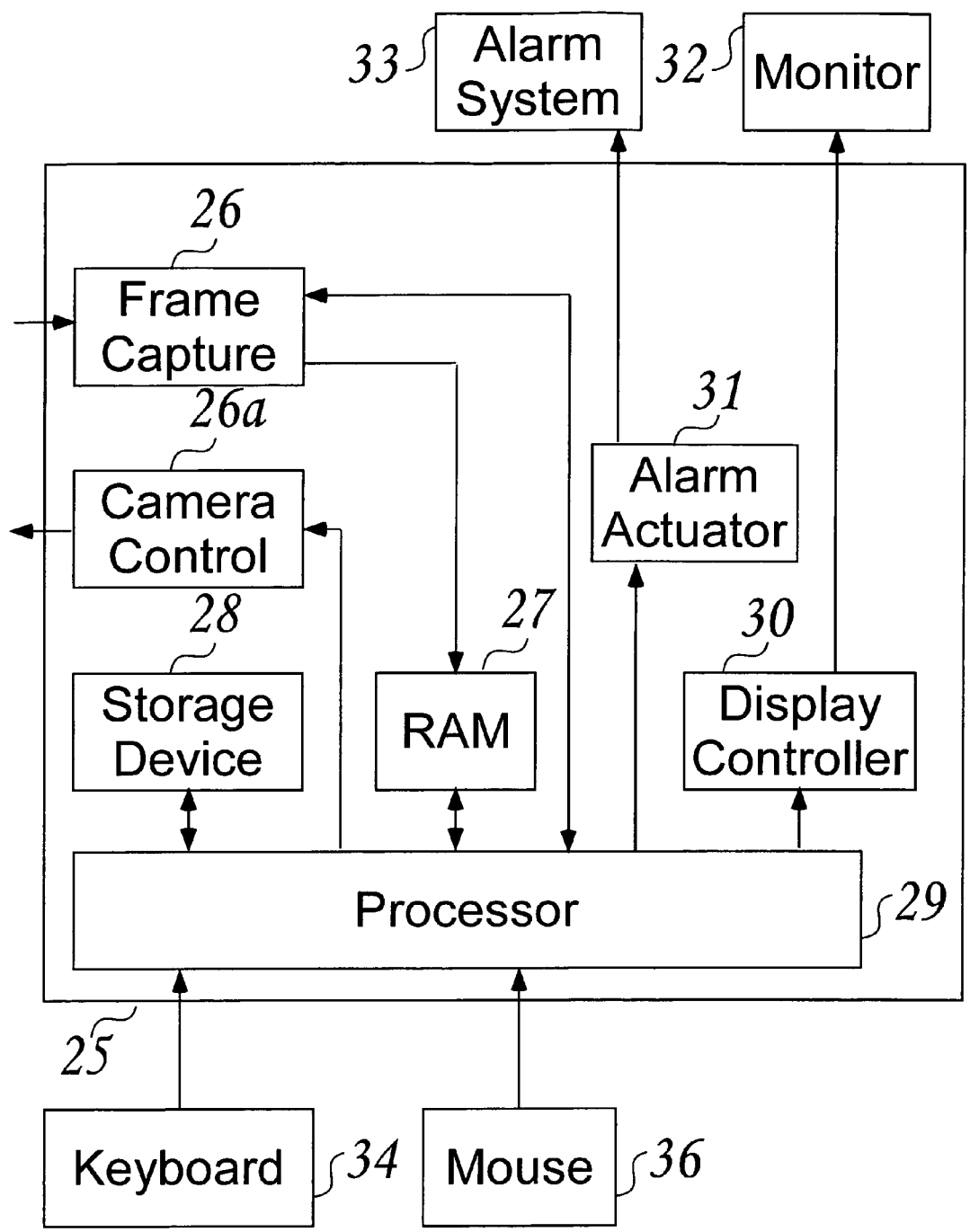
FIG. 4 illustrates an example of a processing device of the present invention.

FIG. 4 illustrates an example of the computer system (processing device) 25 employed in the present invention. As shown in FIG. 4, the computer system 25 includes a frame capturing device 26, a temporary storage device 27, a long-term storage device 28, a processor 29, a display controller 30, and a notification device 31.

The computer 25 employed with the present invention comprises, for example, a personal computer based on an Intel microprocessor 29, such as, for example, a Pentium III microprocessor (or compatible processor, such as, for example, an Athlon processor manufactured by AMD), and utilizes the Windows operating system produced by Microsoft Corporation. The construction of such computers is well known to those skilled in the art, and hence, a detailed description is omitted herein. However, it is understood that computers utilizing alternative processors and operating systems, such as, but not limited to, for example, an Apple Computer or a Sun computer, may be used without departing from the scope and/or spirit of the invention. It is understood that the operations depicted in FIG. 4 function to derive a three-dimensional model of the individual and its surroundings. Extrapolation of the captured image provides an estimate of the three dimensional location of the individual relative to the floor.

It is noted that all the functions of the computer 25 may be integrated into a single circuit board, or it may comprise a plurality of daughter boards that interface to a motherboard. While the present invention discloses the use of a conventional personal computer that is "customized" to perform the tasks of the present invention, it is understood that alternative processing devices, such as, for example, programmed logic array designed to perform the functions of the present invention, may be substituted without departing from the spirit and/or scope of the invention.

The computer 25 includes a frame capture device 26 that interfaces with the camera 100 of FIG. 1. Data representing the image captured by the camera 100 is transferred, via, for example, a video, USB or IEEE 1394 interface to the frame capture device 26 associated with the computer 25 by an appropriate cable (for example, a coaxial cable, a USB cable or IEEE 1394 cable) that also functions to selectively connect the camera 100 to the computer 25, for storage in a frame capture buffer that represents the image in rasterized form, such as, but not limited to, for example, a 640×480 bitmap image having a 24 bit color resolution. It is noted that when the cable is disconnected from the camera 100, the capture device (sensor) 100 may be used to capture images at a location remote from the computer 25, and/or to capture images that are processed by the computer 25 at a later time.

One skilled in the art recognizes that other methods of storage, with fewer or more "lines" of horizontal and vertical resolution, and fewer or more bits of color information, or simply gray-scale information, may be used without departing from the scope and/or spirit of the present invention. Further, it is recognized that if a conventional film camera is employed in place of an electronic imaging device, the image formed on the film is processed to produce a latent image, which may then be digitized using, for example, a scanner. The digitized data is then input to the frame capture buffer of the frame capture device 26.

The temporary storage device 27 stores the digital data output from the frame capture device 26. The temporary storage device 27 may be, for example, RAM memory that retains the data stored therein as long as electrical power is supplied to the RAM.

The long-term storage device 28 comprises, for example, a non-volatile memory and/or a disk drive. The long-term storage device 28 stores operating instructions that are executed by the invention to determine whether the monitored individual has fallen. For example, the storage device 28 stores routines (to be described below) for calibrating the system, and for performing a perspective correction, and 3D mapping.

The display controller 30 comprises, for example, an ASUS model V7100 video card. This card, converts the digital computer signals to a format (e.g., RGB, S-Video, and/or composite video) that is compatible with an associated monitor 32. The monitor 32 may be located proximate the computer 25 or may be remotely located from the computer 25. Further, via the use of commercially available low power video modulators (not shown), such as manufactured by Channel Plus, the output of the display controller 30 may be modulated to a selected television channel, so that a roving staff member can be appraised of the situation in real-time over a portable (e.g., mobile) monitor 32.

The present system may be configured to present a visual image of the individual being monitored, thus allowing the staff to visually confirm the condition of the monitored individual prior to actually going to render assistance. Alternatively, the system can be configured to provide a message on the monitor 32 indicating that the individual is suspected to have fallen.

In the disclosed invention, the notification device 31 comprises an alarm actuator that is interfaced to an external alarm system 33 to provide an audible indication to the attending personnel (staff). It is noted that the present invention may interface to an existing nurse call system provided in, for example, many assisted living institutions. Further, while the present invention discloses an audible alarm, it is understood that a non-audible alarm, such as, but not limited to, for example, a visual indicator, may be employed either in place of or in addition to the audible alarm without departing from the spirit and/or scope of the invention.

The system of the present invention uniquely determines the location of the feature as follows: a digital camera (capture device or sensor) presents the image it records to the computer 25 in the form of a rectangular array (raster) of "pixels" (picture elements), such as, for example 640×480 pixels. That is, the large rectangular image is composed of rows and columns of much smaller pixels, with 640 columns of pixels and 480 rows of pixels. A pixel is designated by a pair of integers, $(a_i, b_i)$, that represent a horizontal location "a" and a vertical location "b" in the raster of camera i. Each pixel can be visualized as a tiny light beam shooting out from the sensor (camera) 100 in a particular direction. The camera does not "know" where along that beam the "feature" which has been identified is located. However, when the same feature has been identified in any two cameras, the point where the two "beams" from the two cameras cross precisely locates the feature in the three-dimensional volume of the room. For example, the calibration process (to be described below) determines which pixel addresses (a, b) lie nearest any three-dimensional point (x, y, z) in the monitored volume of the room. Whenever a feature on the subject is visible in two (or more) cameras, the three-dimensional location of the feature can be obtained by interpolation in the calibration data. This is disclosed in, for example, pages 27 to 33 of *Approximations For Digital Computers*, by Cecil Hastings, Jr. (Princeton University Press, 1955).

The operations performed by the computer 25 on the data obtained by the camera(s) will now be described. An initial image view $C^{i,j}$ captured by a camera is processed to obtain a two-dimensional physical perspective representation. The two-dimensional physical perspective representation of the image is transformed via a general metric transformation:

$$P^{i,j} = \sum_{k=1}^{N_X} \sum_{l=1}^{N_Y} g_{k,l}^{i,j} C^{k,l} + h^{i,j}$$

to the "physical" image $P^{i,j}$. In the disclosed embodiment, i and k are indices that range from 1 to $N_X$, where $N_X$ is the number of pixels in a horizontal direction, and j and l are indices that range from 1 to $N_Y$, where $N_Y$ is the number of pixels in a vertical direction. The transformation from the image view $C^{i,j}$ to the physical image $P^{i,j}$ is a linear transformation governed by $g_{k,l}^{i,j}$, which represents both a rotation and a dilation of the image view $C^{i,j}$, and $h^{i,j}$, which represents a displacement of the image view $C^{i,j}$.

A three-dimensional correlation is performed on all observed features which are uniquely identified in both images. For example, if $L^{i,j}$ and $R^{i,j}$ are defined as the left and right physical images of the subject under study, respectively, then $$P^{k,l,m} = f^{k,l,m}(L,R)$$

is the three-dimensional physical representation of all uniquely-defined points visible in a feature of the subject which can be seen in two cameras, whose images are designated by L and R. The transformation function $f$ is derived by using the physical transformations for the L and R cameras and the physical geometry of the stereo pair derived from the locations of the two cameras.

Figure 5:
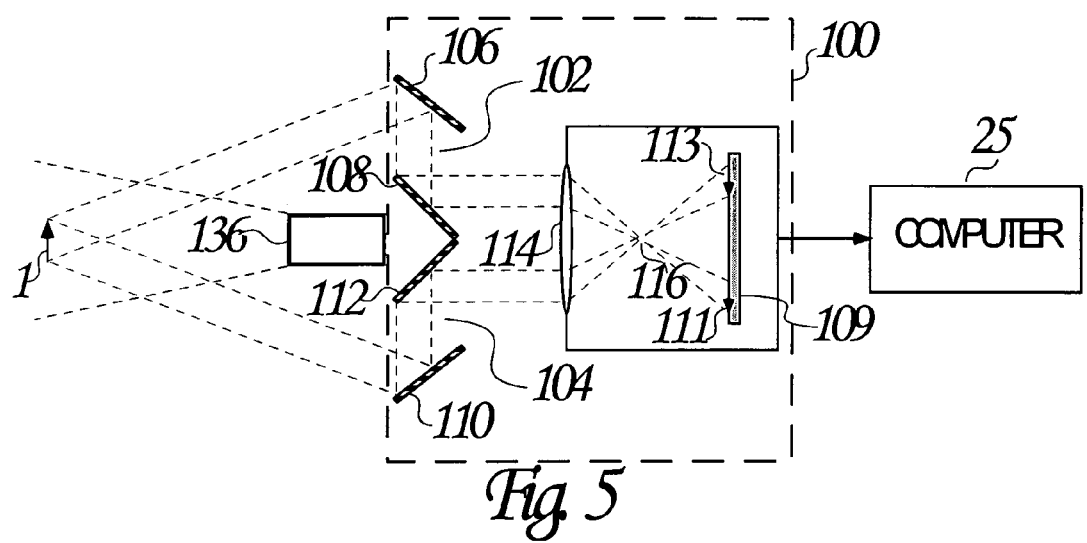
FIG. 5 illustrates a second example of a capture device used with the present invention.

A second embodiment of a camera used with the present invention is illustrated in FIG. 5. A discussion of the elements that are common to those in FIG. 1 is omitted herein; only those elements that are new will be described.

The second embodiment differs from the first embodiment shown in FIG. 1 by the inclusion of a pattern projector (generator) 136. The pattern projector 136 assists in the stereoscopic object analysis for the three-dimensional mapping of the object. Since the stereoscopic analysis and three-dimensional mapping of the object is based on a shift of each point of the object in the right and left images, it is important to identify each specific object point in both the right and left images. Providing the object with distinct markings provides the best references for analytical comparison of the position of each point in the right and left images, respectively.

The second embodiment of the present invention employs the pattern generator 136 to project a pattern of light (or shadows) substantially perpendicular to the subject and its surrounding that appear as distinct markings. In the second embodiment, the pattern projector 136 is shown to illuminate the subject 1 from a vantage position of the center of the camera 100. However, it is understood that the pattern generator may be located at different positions without departing from the scope and/or spirit of the invention.

The pattern generator 136 projects a stationary pattern of light onto the subject 1 and its surroundings. The projected pattern is preferably invisible (for example, infrared) light, so long as the camera can detect the image and/or pattern of light. However, visible light may be used without departing from the scope and/or spirit of the invention. It is noted that the projected pattern is especially useful when the subject 1 or its surroundings are relatively featureless, making it difficult to construct a 3D representation of the monitored volume.

FIG. 6 illustrates a grid form pattern 138 projected by the pattern projector 136. It should be appreciated that alternative patterns may be utilized by the present invention without departing from the scope and/or spirit of the invention. For example, the pattern can vary from a plain quadrille grid or a dot pattern to more distinct marks, such as many different small geometrical shapes in an ordered or random pattern.

In the grid form pattern shown in FIG. 6, dark lines are created on an illuminated background. Alternately, if multiple sequences of camera-captured frames (while the subject is motionless) are to be analyzed, a moving point of light, such as, for example, a laser scan pattern, can be utilized. In addition, a momentary illumination of the entire area can provide an overall frame of reference for the analyzed subject.

FIG. 7(*a*) illustrates a left image 140, and FIG. 7(*b*) illustrates a right image 142 of a stereoscopic view of a concave volume produced by the stereoscopic camera 100, along with a distortion 144 and 146 of the grid form pattern 138 on the left and right images 140 and 142, respectively. In particular, it is noted that the distortion 144 and 146 represents a gradual horizontal displacement of the grid form pattern to the left in the left image 140, and a gradual horizontal displacement of the grid form pattern to the right in the right image 142.

A variation of the second embodiment involves using a pattern generator that projects a dynamic (e.g., non-stationary) pattern, such as a raster scan onto the subject 1 and its surroundings. This variation requires the use of a camera which has an image capture time that is short in comparison with the time during which the pattern changes, but which is long in comparison to the time required to once cover the region of interest with the pattern.

Another variation of the second embodiment is to use a pattern generator that projects uniquely-identifiable patterns, such as, but not limited to, for example, letters, numbers or geometric patterns, possibly in combination with a static or dynamic featureless pattern. This prevents the mislabeling of identification of intersections in stereo pairs, that is, incorrectly correlating an intersection in a stereo pair with one in a second photo of the pair, which is actually displaced one intersection along one of the grid lines.

The operations performed by the computer 25 to determine whether a subject has fallen will now be described.

Images obtained from the camera 100 are processed by the frame capture device 26 to derive parameters that describe the position of the subject 1 and the subject's orientation. This data is used to form a database that is stored in either the short term storage device 27 or the long-term storage device 28 of the computer 25. Subsequent images are then analyzed in real-time for changes in order to determine the motion, and/or rate of motion and/or change of orientation of the subject. This data is used to characterize the status of the subject; that is, identifying a situation in which the subject may have fallen, or other indication of a need for intervention by a staff member.

For example, a database for the derived parameters may be constructed using a commercially available software program called ACCESS, which is sold by Microsoft. If desired, the raw image may also be stored. One skilled in the art will recognize that any fully-featured database may be used for such storage and retrieval, and thus, the construction and/or operation of the present invention is not to be construed to be limited to the use of Microsoft ACCESS.

Subsequent images are analyzed for changes in position, motion, rate of motion and/or change of orientation of the subject. The tracking of the sequences of motion of the individual provides further optional improvement to the algorithm. By comparing sequential images (that are, for example, only seconds apart) of walking, standing, or sitting individuals where at some point a standing individual is not in an image and a fall-suspicious image is identified, the provided alert is less likely to represent a false alarm. Furthermore, depending on the image capture rate, the analysis can capture the individual in the act of falling and possibly identify the cause. If the result of the fall is caused by an external condition, such as, but not limited to, for example, a worn section of a carpet that the subject is walking on, such information would enable one to take preventive measures to prevent a recurrence. In addition, by forming a database of information indicating gestures and motions of individuals preceding a fall, individuals that are prone to falling can be identified and placed in a better environment with better fall mitigating features (such as, for example, providing the subject with padded clothing and/or softer floors).

For example, it is usually easy to recognize and track the mouth of a subject. Assume the person is moving across the room and the mouth is being tracked. Suddenly, the movement of the mouth across the room rapidly increases while, at the same time, its position is descending towards the floor. This situation is interpreted as a fall in progress. Further (additional) analysis of the previous images may indicate an abnormal interuption of leg motion, indicating that the subject may have tripped over something, such as a bad carpet section. Even if the subject caught himself/herself and did not actually fall, the system can report this incident to the staff, suggesting a change to the environment which could prevent a future actual fall. This data can be used to visually characterize the status of the subject, identifying a fall or other indications of a need for intervention.

The present invention is not limited to the use of visual clues. The instant invention recognizes that clues other than visual clues are also helpful in determining whether a subject has fallen, or is at risk of falling. For example, a fall (or risk of falling) may also be identified using sound analysis. A sudden "thud" noise, a shout, a scream, or other sounds of uncontrolled contact or urgency may be identified by analysis of the time signature (the thud or shout) or by spectral analysis (the scream). Accordingly, the accuracy of determining that a fall has occurred (that is, reducing false alarms) is achieved by adding sound recognition to the system. It is noted that a single microphone, optionally placed with one of the cameras, is sufficient to detect such sounds. However, if it is desired to pinpoint the location from which the sound emanates, three (or more) microphones are provided, so that triangulation of the emanated sound can be performed.

An example of spectral analysis is disclosed at pages 95 et seq. of *An Introduction to Random Vibrations Spectral and Wavelet Analysis*, by D. E. Newland (Essex:Longman Scientific and Technical, 1993).

Voice recognition software is commercially available and can also be incorporated in the present fall detection system. Such programs are sold by companies such as, for example, IBM and Hewlett-Packard. The present system can take advantage of this technology to recognize words spoken by the subject, and act on them.

Voice stress analysis software is also commercially available, and can be incorporated into the present invention. Such software recognizes the urgency in speech, independent of the words that are spoken.

The instant invention concludes that a subject is healthy when the subject, for example, moves about in a maimer that shows energy and clarity of purpose. Conversely, a subject is considered to be unhealthy when the subject is, for example, lying on the floor, motionless, and/or turning abnormally red or blue in color, and/or perhaps not breathing (when voice recognition and/or voice stress analysis software is incorporated into the system). If the subject ceases energetic motion and sits down or lies down, a "measure of health" (e.g., status) might gradually be reduced from a previous value. This "measure of health" (status) can be represented by a numerical value (for example, from 0 to 100), by the height of a bar graph, or the color of a region on a display screen associated with a particular subject, or some combination of these indications.

When the system of the present invention concludes that intervention by a staff member is required, the alarm 33 is activated to alert the attending personnel.

An "alarm" may include, but is not limited to: (1) an audible alarm at one or more nurse station(s); (2) a flashing light at one or more nurse station(s) and/or in and/or outside of the subject's room; (3) a signal by wired or wireless means to the staff; (4) a signal by wired or wireless means to a physician or other professional who is "on call"; and (5) the transfer of information to another information system within or outside the facility. In general, the kinds of alarm, their priorities (i.e., what to do first; what to do next if the preceding alarm does not appear to have obtained the needed help for the subject) and the time intervals from the issuing of one alarm to the next, are all determined when the system is configured, and may be updated as the need arises.

The present system can also serve as a security device, by identifying individuals that are intruders. Unlike a conventional security system, the instant invention permits the unimpeded activities of the subject being monitored and other expected animate objects (such as pets), as well as the opening and closing of doors, windows and other events that would trigger a false alarm in a conventional security system.

For example, the system can be configured to conclude that anyone entering the facility from the outside (either through a door, window or other orifice) is an intruder unless the person has previously been cleared by a security guard. The system can determine if this occurs by tracking the sequential images where an animate object previously not within the monitored space suddenly appears in the vicinity of such access points. Such an image will be regarded as an intruder until cleared by an authorized individual.

There are many useful alternatives to declaring everyone an intruder. For example, if the entire region of the home where the subject lives is monitored (the preferred embodiment), then the system always knows where the subject is. If another person enters the home, the system immediately knows that that person is not the subject. The subject can "tell" the system that this person has permission to enter by a means selected during the system configuration, such as, but not limited to, pushing a predetermined button, issuing a predetermined verbal signal, or issuing a predetermined hand signal.

If only part of the region where the subject may be found is monitored (for example, the subject leaves his/her facility for meals or shopping) then the subject can identify himself/ herself by, but not limited to, for example, pressing a predetermined code on a keypad, providing a prearranged hand or voice signal, or having someone monitoring the system manually acknowledge that the subject has returned.

If the subject 1 receives many routine "visitors", such as, for example, care givers, family and/or friends, then such visitors can be recognized as authorized visitors by, for example, their wearing of special identifying items, such as, but not limited to, predetermined hats or badges that the system automatically recognizes. These items can be used interchangeably by visitors, or, alternatively, unique items can be issued to specific persons. However, if security is a serious issue, this method should be used with caution, since an intruder might be able to get such an identifying item in an unauthorized manner.

The previous discussion dealt with the objective and reliable characterization of the physical condition and need for attention of the subject within a monitored region, along with its security application. The present invention is equally suitable for the characterization of any object that moves in time, such as, for example, components on a conveyor belt. This can include rigid objects or flexible materials capable of changing their shape in time, or even liquids, when the three-dimensional capability is included. The present system can monitor any change in their parameters.

A specific software implementation of the present invention will now be described. However, it is understood that variations to the software implementation may be made without departing from the scope and/or spirit of the invention. While the following discussion is provided with respect to the installation of the present invention in a one bedroom apartment of a multi-unit assisted living dwelling, it is understood that the invention is applicable to any type of facility, such as, but not limited to, for example, a single family house, a nursing home, or a hospital without departing from the scope and/or spirit of the invention. Further, the number of rooms monitored by the present invention may be more or less than that described below without departing from the scope and/or spirit of the invention.

FIG. 8 illustrates a typical apartment in which a subject 1 may reside. The apartment includes three monitored areas; namely a bedroom 400, a bathroom 500 and a hallway 600. A plurality of capture devices 100a to 100g are positioned at strategically selected locations (the locations of which are determined, for example, in the manner discussed above) so as to afford a maximum field of view. Capture device (camera) pair 100a and 100b are processed for right and left images, respectively, of the bedroom 400. Camera pair 100c and 100d are processed for right and left images, respectively, of the bathroom 500. Camera pair 100e and 100f are processed for right and left images, respectively, of a first portion of the hallway 600 that is to be monitored, while camera pair 100f and 100g provide right and left images, respectively, of a second portion of the hallway 600 that is to be monitored. It is noted that the images from the various camera can be processed either sequentially or simultaneously.

Figure 9:
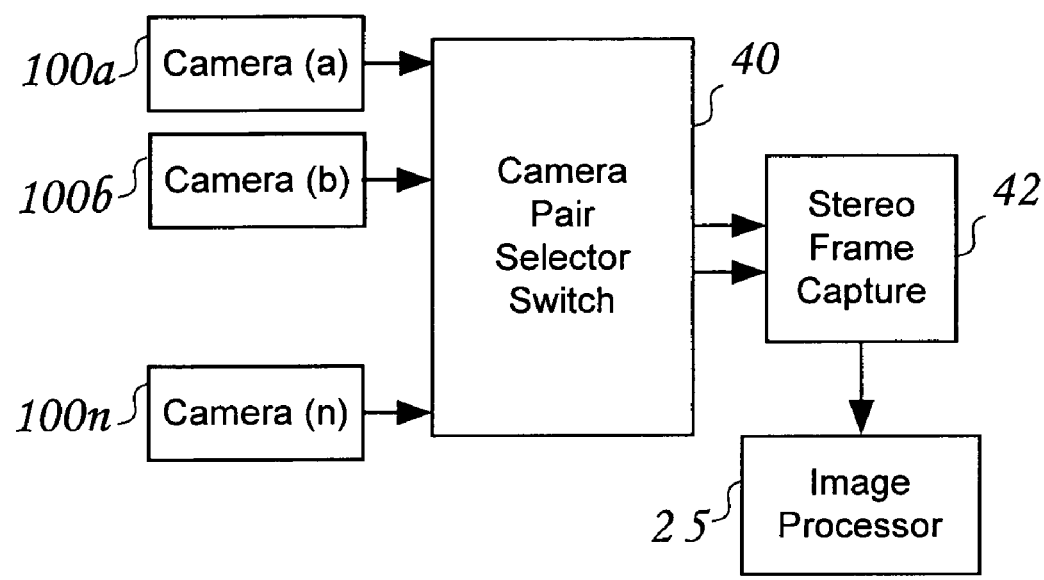
FIG. 9 illustrates a multi-sensor image processing arrangement according to the present invention.

FIG. 9 illustrates an example of how the plural capture devices 100a to 100g in FIG. 8 are interfaced to the image processing device (computer) 25. However, it is understood that the manner of interfacing the plural capture devices to the image processing system is not critical to the operation of the present invention, and alternative interfacing techniques are equally applicable to the one disclosed herein.

As shown in FIG. 9, capture devices 100a to 100n are connected to a camera switch 40 that operates to select a pair of adjacent cameras for subsequent processing. Such a camera switch 40 is based upon, for example, commercially available video multiplexer integrated circuits, such as, for example, a HI-524 four channel video multiplexer manufactured by Harris. However, it is understood that similar type switches manufactured by other companies may be substituted for the disclosed switch. The camera switch 40 outputs two images (one image from each camera), which is input to a stereo frame capture device 42. The capture device 50 outputs a single image that is input to the image processor (computer) 25 in the manner described above. In this regard, it is noted that in the arrangement of FIG. 9, the frame capture device 26 (of FIG. 4) has been replaced with the stereo frame capture device 42, and that the stereo frame capture device 42 is housed outside of the image processor 25.

Figure 10:
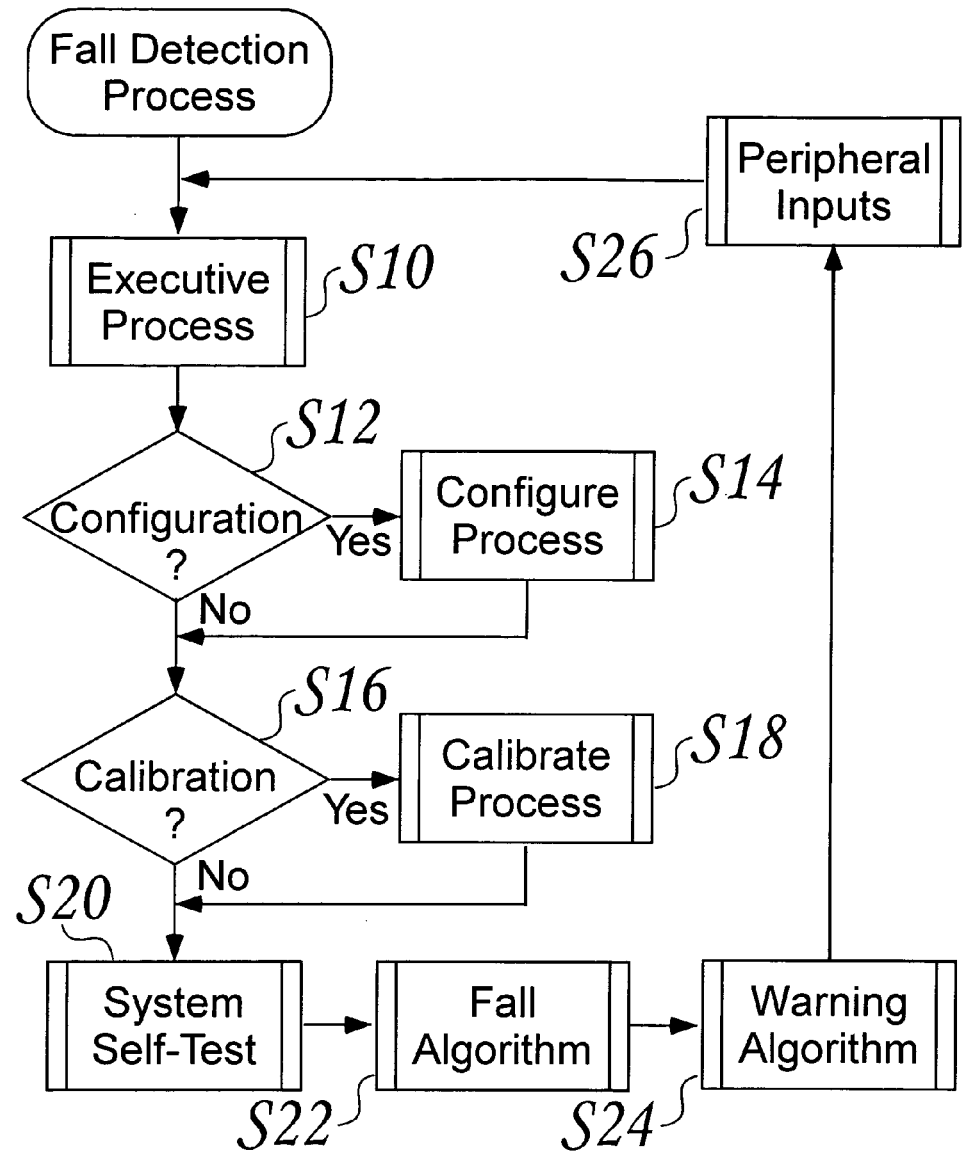
FIG. 10 illustrates an example of a fall detection routine according to the present invention.

FIG. 10 illustrates the fall detection process that is executed by the present invention. Initially, an Executive Process subroutine is called at step S10. Once this subroutine is completed, processing proceeds to step S12 to determine whether a Configuration Process is to be performed. If the determination is affirmative, processing proceeds to step S14, wherein the Configuration subroutine is called. Once the Configuration subroutine is completed, processing continues at step S16. On the other hand, if the determination at step S12 is negative, processing proceeds from step S12 to S16.

At step S16, a determination is made as to whether a Calibration operation should be performed. If it is desired to calibrate the system, processing proceeds to step S18, wherein the Calibrate subroutine is called, after which, a System Self-test operation (step S20) is called. However, if it is determined that a system calibration is not required, processing proceeds from step S16 to step S20.

Once the System Self-test subroutine is completed, a Fall Algorithm subroutine (step S22) is called. Thereafter, a Warming Algorithm subroutine (step S24) and a Peripheral Input subroutine (step S26) are called, before the process returns to step S10.

The above processes and routines are continuously performed while the system is monitoring the subject.

Figures 11A, 11B, 11C:
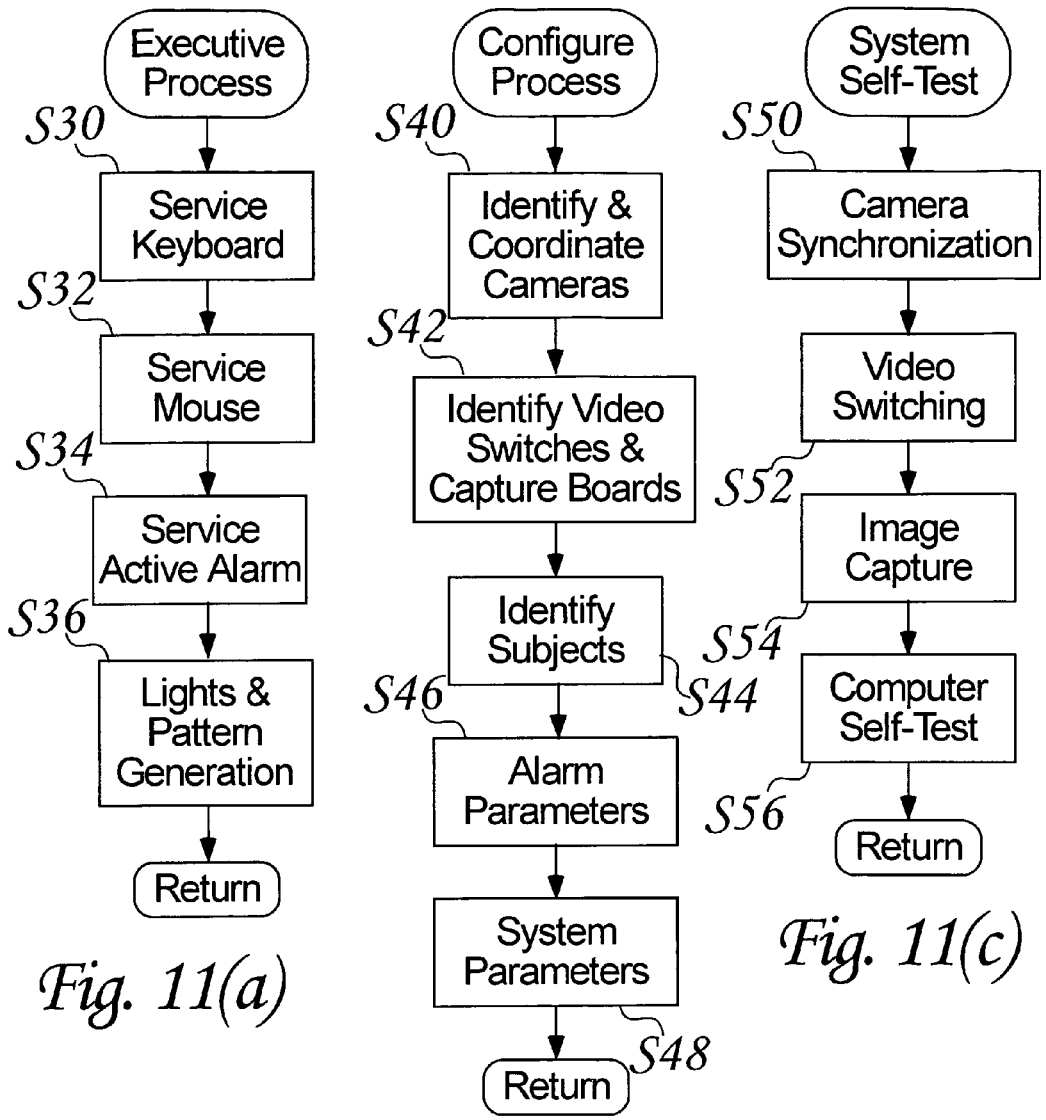
FIG. 11(a) illustrates an example of an Executive Process subroutine called by the fall detection routine of FIG. 10.
FIG. 11(b) illustrates an example of a Configure subroutine called by the fall detection routine of FIG. 10.
FIG. 11(c) illustrates an example of a System Self-test subroutine called by the fall detection routine of FIG. 10.

FIG. 11(a) illustrates the Executive Process subroutine that is called at step S10. Initially, a Keyboard Service process is executed at step S30, which responds to operator input via a keyboard 34 (see FIG. 4) that is attached to the computer 25. Next, a Mouse Service process is executed at step S32, in order to respond to operator input from a mouse 36 (see FIG. 4). At this point, if an alarm has been raised that has not yet been acknowledged, an Active Alarm Service process is performed (step S34). This process determines whether and when additional alarms must be issued to insure that aid will be provided to the subject.

Step S36 is executed when the second camera embodiment is used. In this step, projector 136 (FIG. 5) is controlled to generate patterns of light to provide artificial features on the subject when the visible features are not sufficient to determine the condition of the subject.

When this subroutine is complete, processing returns to the Fall Detection Process of FIG. 10.

FIG. 11(b) illustrates the Configure subroutine that is called at step S14. This subroutine comprises a series of operations, some of which are performed automatically and some of which require operator input. At step S40, the capture devices (cameras) are identified, along with their coordinates (locations). It is noted that some cameras may be designed to automatically identify themselves, while other cameras may require identification by the operator. It is noted that this operation to update system information is required only when the camera (or its wiring) is changed.

Step S42 is executed to identify what video switches and capture boards are installed in the computer 25, and to control the cameras (via camera controller 26a shown in FIG. 4) and convert their video to computer usable digital form. Thereafter, step S44 is executed to inform the system which subject is to be monitored. Alarm parameters (step S46) to be associated with the selected subject is then set. Then, step S48 is executed to input information about the subject to be monitored. Processing then returns to the main routine in FIG. 10.

FIG. 11(c) illustrates the operations that are performed when the System Self-test subroutine (step 20) is called. This subroutine begins with a Camera Synchronization operation (step S50), in which the cameras are individually tested, and then, re-tested in conceit to insure that they can capture video images of monitored volume(s) with sufficient simultaneity that stereo pairs of images will yield accurate information about the monitored subjects. Next, a Video Switching operation is performed (step S52) to verify that the camera video can be transferred to the computer 25. An Image Capture operation is also performed (step S54) to verify that the images of the monitored volume, as received from the cameras, are of sufficient quality to perform the tasks required of the system. The operation of the computer 25 is then verified (step S56), after which, processing returns to the routine shown in FIG. 10.

Figure 12:
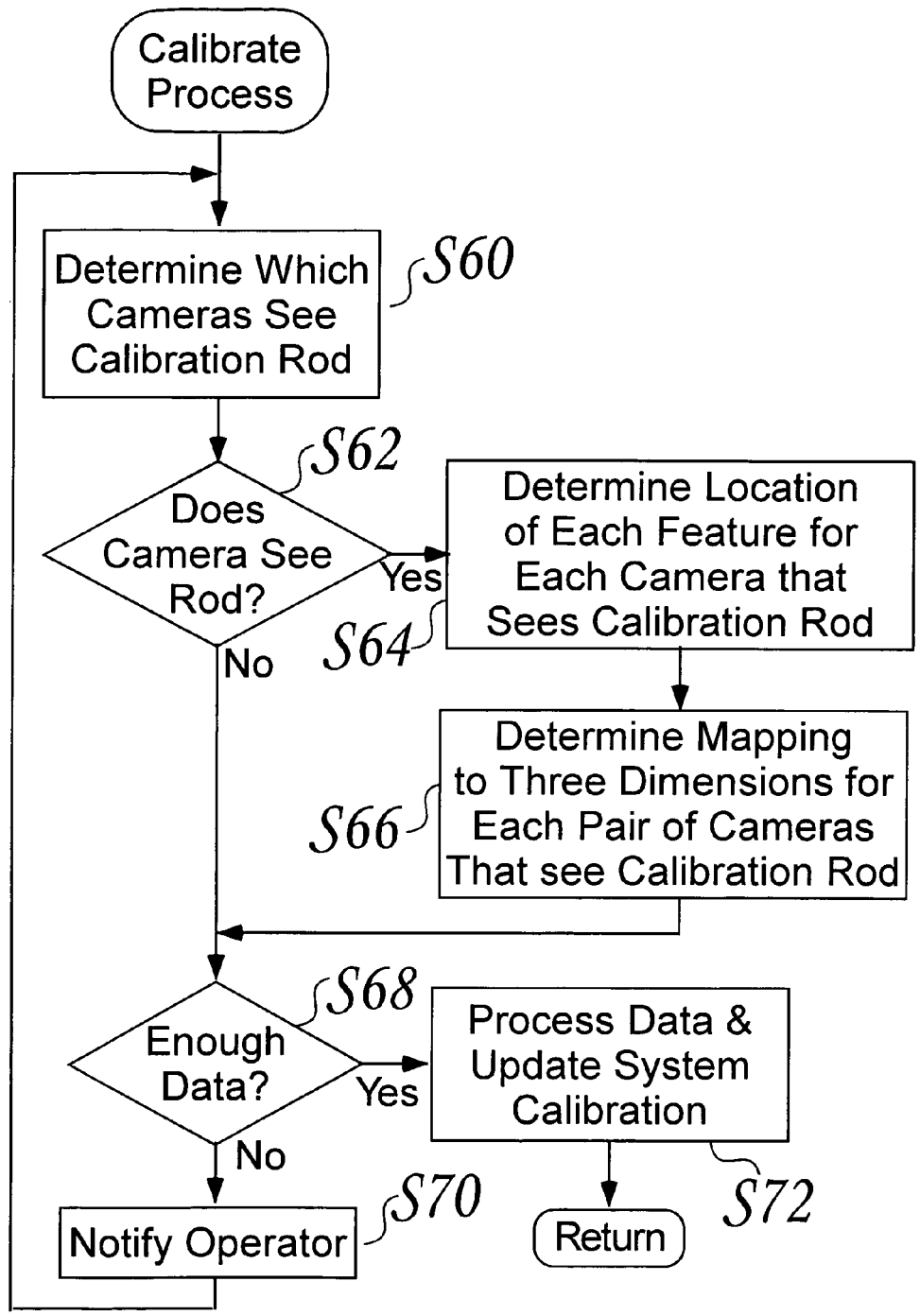
FIG. 12 illustrates an example of a Calibrate subroutine called by the fall detection routine of FIG. 10.

The Calibrate subroutine called at step S18 is illustrated in FIG. 12. In the disclosed embodiments, the calibration operation is performed with the aid of a "calibration rod," described elsewhere, that is immediately recognized by the system when it enters a monitored volume, thus raising a Calibration flag (step S60). Each camera that sees the calibration rod within their respective field of view is identified (step S62), so that the pixel nearest each feature on the calibration rod is identified (step S64). It is noted that steps S62 and S64 are performed for each camera that is connected to the monitoring system.

Next, the location of each visible calibration rod feature is identified for every combination of cameras that see that feature (step S66). This maps the pixels in the camera pairs to three-dimensional locations in the control volume. Then, processing proceeds to step S68 to determine whether additional data is required.

When the calibration rod is not seen by a camera, processing proceeds from step S62 to step S68, to determine whether enough data has been collected for the monitored volume. That is, a determination is made as to whether the collected data is sufficient to accurately determine the location of a detected feature everywhere in the monitored volume. If the process determines that additional data is required, the operator (e.g., the individual calibrating the system) is notified (step S70), by, for example, a message displayed on a system video terminal, pager, or other suitable device, that more calibration is required. Thereafter, processing returns to step S60 to continue the calibration procedure.

When sufficient data has been collected, processing proceeds from step S68 to step 72, to map camera pairs to the three-dimensional volume being monitored. This data is used to update the system calibration tables. The Calibration subroutine is thus completed, and processing returns to the main program shown in FIG. 10.

Figure 13:
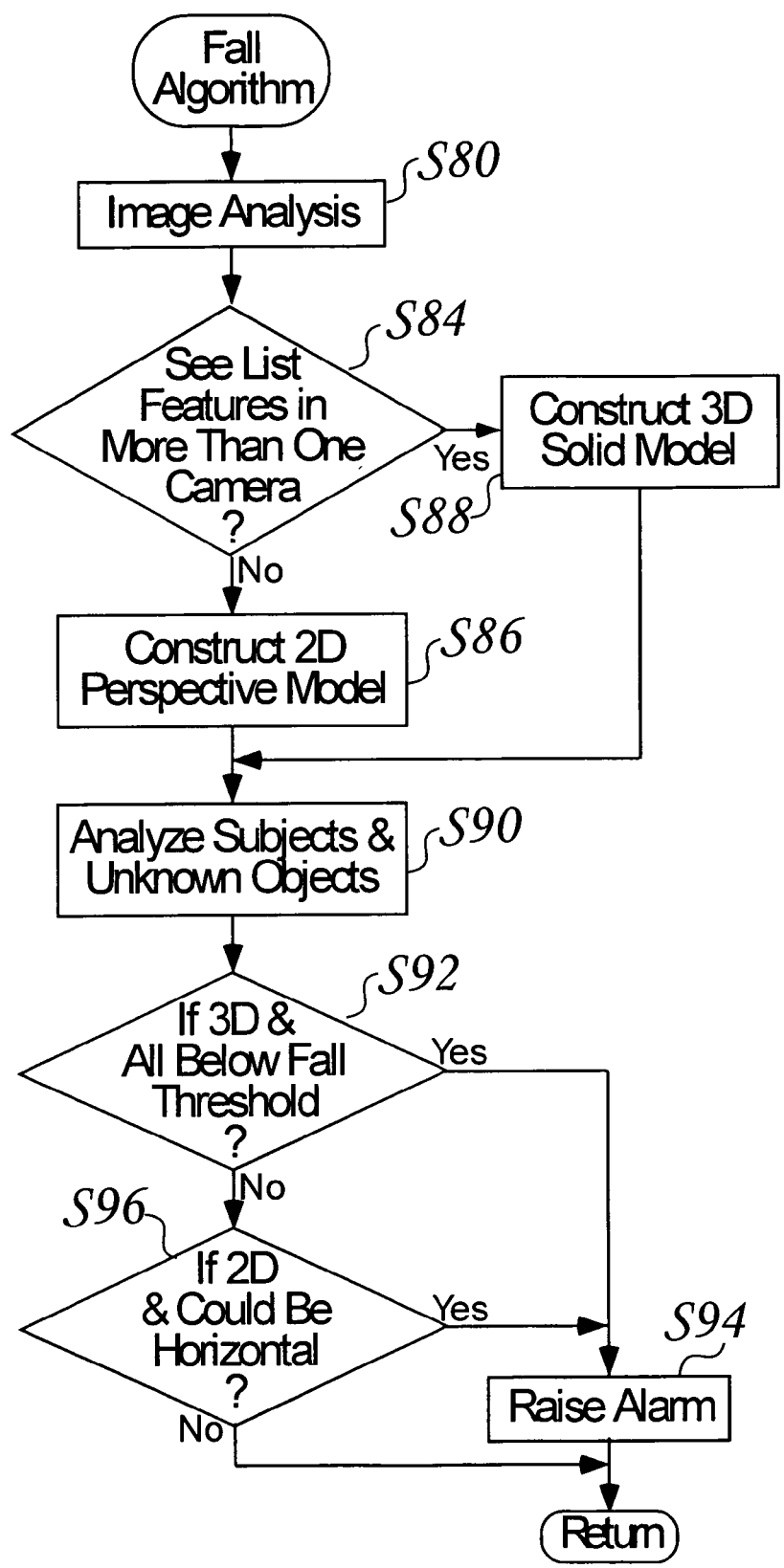
FIG. 13 illustrates an example of a Fall Algorithm subroutine called by the fall detection routine of FIG. 10.

FIG. 13 illustrates the Fall Algorithm subroutine that is called at step S22. Initially, an Image Analysis subroutine (to be described below) is called at step S80. Briefly, the image analysis subroutine creates a list for each camera, in which the list contains data of: unidentified objects; the subject; and identified feature(s) on the subject for each camera. Once the lists are created, processing resumes at step S84, where the number of cameras which see each list element is determined. For each camera that sees each list element, a determination is made as to whether only one camera sees the feature or whether more than one camera sees the feature. If only one camera sees the feature, a two dimensional model is constructed (step S86). The two dimensional model estimates where the feature would be on the floor, and where it would be if the subject is upright.

However, if more than one camera sees the feature, the three dimensional location of the feature is determined at step S88. It is noted that steps S84, S86 and S88 are repeated for each camera that sees the list element.

Both the two dimensional model and the three dimensional model assemble the best estimate of where the subject is relative to the floor, and where any unknown objects are relative to the floor (step S90). Then, at step S92, the subject and unknown objects for which a three dimensional model is available is tested. If the model places the subject or unknown object close enough to the floor to be below a predetermined fall threshold, an Alarm flag is set (step S94) to set the alarm.

If the three dimensional model places the subject or unknown object above the predetermined fall threshold, the two dimensional model is tested (step 96) to determine whether the data therein is consistent with a fall. For a subject, this "consistency" test is whether the known height of the individual would be consistent with the observed length of the subject. For an unknown object, the "consistency" test is whether its estimated dimensions are consistent with a fallen person. If "consistency" is observed, the general Alarm flag is set at step S94. However, if no "consistency" is observed, the subroutine is completed. Once the Alarm flag is set, the subroutine is completed.

In this regard, it is noted that a visual display device may be used instead of (or in addition to) the audible alarm. The visual display device may comprise, for example, an indicator light that is illuminated when the Alarm flag is set, or a monitor that provides a warning message. However, it is understood that alternative visual display device, such as, but not limited to a monitor or printer, may be provided.

Further, it is noted that the audible alarm and/or the visual display device may additionally provide supplemental information, such as, but not limited to, for example, the name of the monitored subject for which the alarm was activated, and/or the location of the monitored subject for which the alarm was activated, and/or special requirements of the monitored subject for which the alarm was activated.

Figure 14:
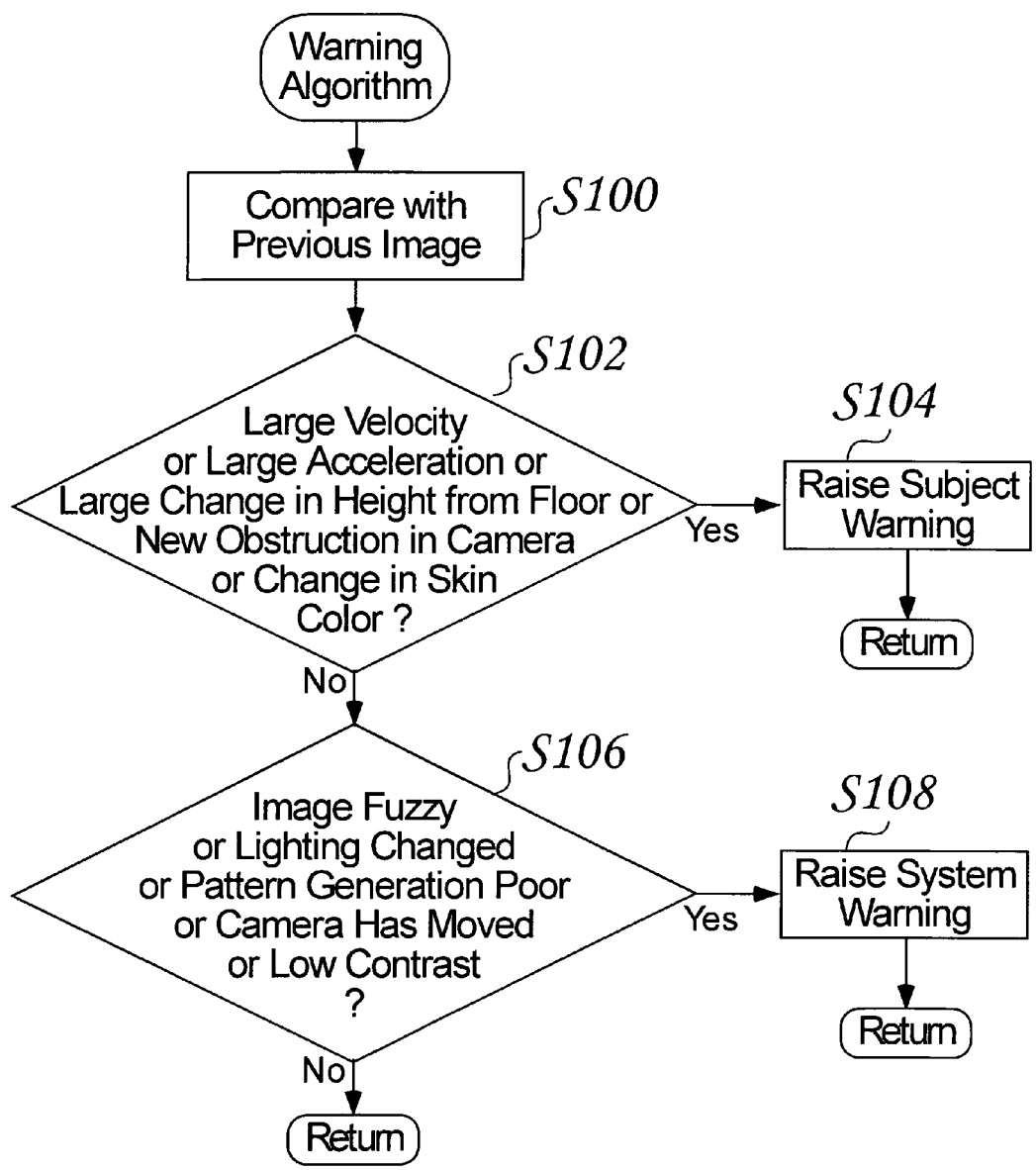
FIG. 14 illustrates an example of a Warning Algorithm subroutine called by the fall detection routine of FIG. 10.

FIG. 14 illustrates the Warning Algorithm subroutine that is called at step S24. This subroutine performs a further analysis of the subject behavior by comparing present image data with previous image data, and further, examining the quality of the system data. Specifically, the most recent available three dimensional models of the subject are looked at (step S100) to determine what differences have occurred in the observable features since that time. The distance the feature has moved, divided by the time between the present and past determinations, yield the velocity of the feature. If it has a significant speed, an additional history time may be analyzed to determine the acceleration (rate of change of velocity). If this is more than a predetermined value, such as, but not limited to, for example, 10 percent of the acceleration due to gravity, a fall may be in progress. Similarly, if the height of a feature on the subject is rapidly descending toward the floor, a fall may be in progress. If an obstacle has just blocked the view of one or more cameras, the subject may be at risk. Finally, if the skin color appears, for example, more red or more blue than in the most recent previous image, or a reference image when the subject was known to be healthy, then the subject may be at risk. In any of these cases, a Subject Warning flag is set (steps S102 and S104). This alerts the system operator (staff) that action may be needed soon, but it does not have the urgency of an actual alarm. Thereafter, processing is completed.

If none of the above warning conditions are present, the system examines the data to determine whether a system degradation has occurred. Good contrast between the subject and the current background results in the edge of the subject being sharply visible. However, when the edges are not sharp, it may mean that the system accuracy has been reduced. If the background (or other changes) indicate that the lighting has changed in an undesirable way, or if a pattern generation (with respect to the second embodiment) is in process and the processing is ambiguous, that is reason for concern. Further, if the locations of fixed objects appear to have changed in a camera's field of view, that indicates that the camera may have been moved. Since the system knows the three dimensional location of the fixed objects, the system can partially compensate for a slight displacement of the camera. However, to ensure optimum performance of the system, the Calibration operation should be re-performed. If any of these conditions are observed (step S106), a System Warning flag is set (step S108). This alerts the operator that a user intervention is necessary to improve the system's performance. Thereafter, processing of this subroutine is completed.

If none of the warning conditions in steps S102 and S106 are detected, processing of the subroutine is completed, and processing returns to the main program.

Figure 15:
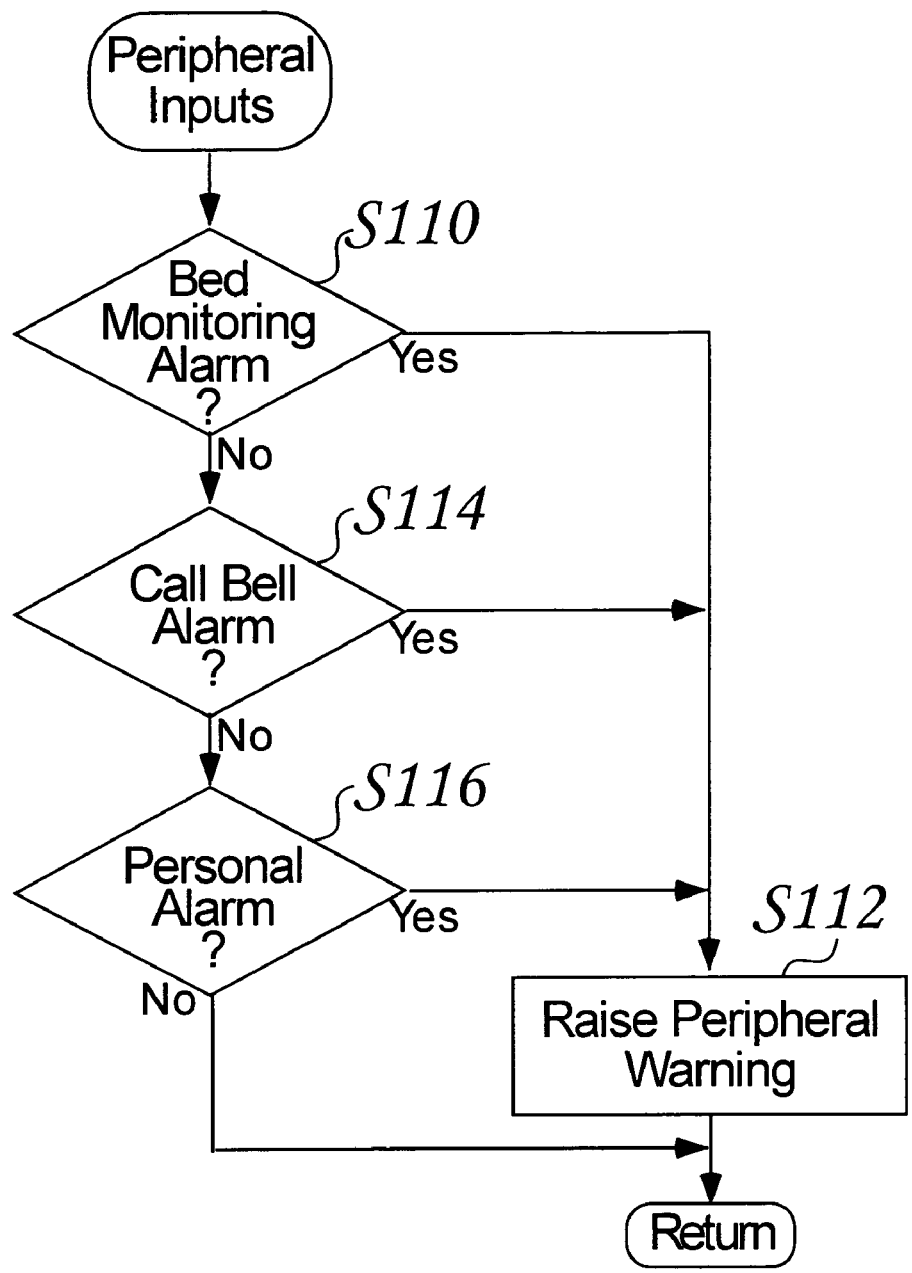
FIG. 15 illustrates an example of a Peripheral Input subroutine called by the fall detection routine of FIG. 10.

FIG. 15 illustrates the Peripheral Input subroutine that is called at step S26. This subroutine is performed to allow other sources of alarms to take advantage of the staged alarm producing, raising, monitoring and tracking of the present invention. For example, the following discussion is provided with respect to the installation of the present invention in a facility that includes an existing alert system, such as, for example, a bed monitoring alarm system, a call bell alarm system, and a personal staff member alarm system. However, it is understood that this subroutine may be altered to accommodate the specific features of the facility in which the present invention is installed without departing from the scope and/or spirit of the invention.

When the instant invention detects an alarm signal produced by the Bed Monitoring Alarm system of the facility (step S110), a peripheral warning signal (step S112) is produced. Similarly, if the Call Bell Alarm (step S114) or the Personal Alarm (step S116) of the facility is activated, the monitoring system produces the peripheral warning signal (step S112). If no alarm conditions are present, processing of the Peripheral Input subroutine is completed.

Figure 16:
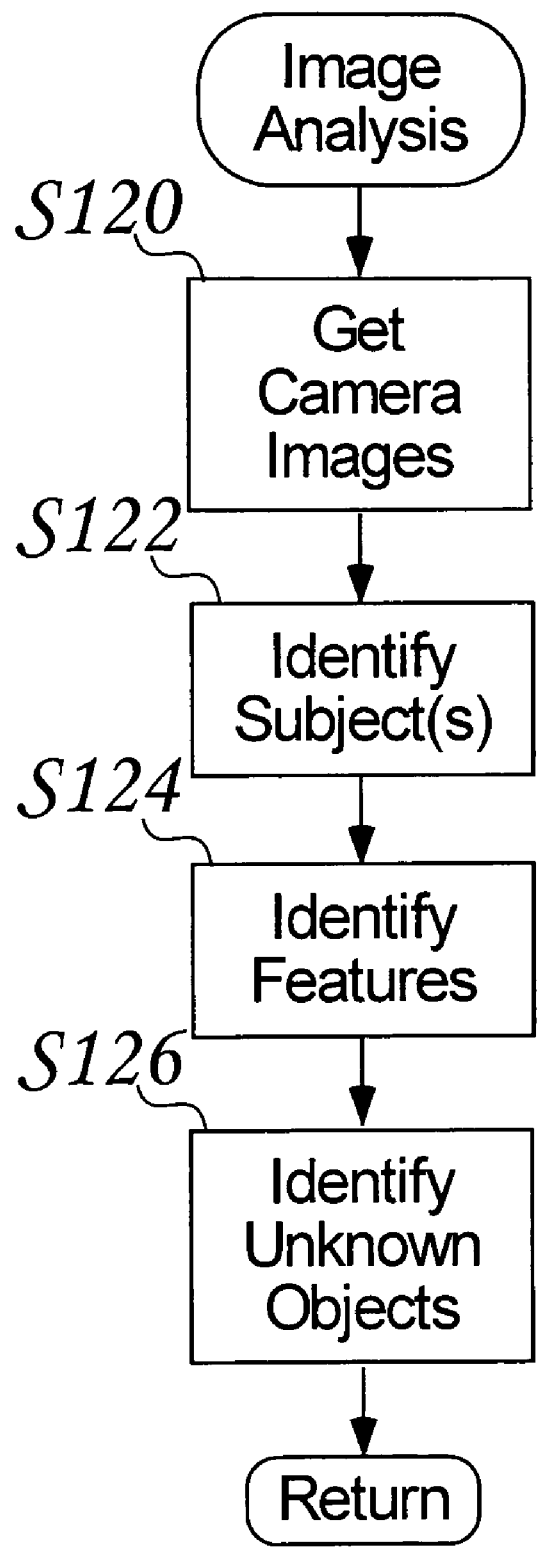
FIG. 16 illustrates an example of an Image Analysis subroutine called by the fall detection routine of FIG. 13.

FIG. 16 illustrates the Image Analysis subroutine that is called at step S80. As previously noted, this subroutine creates a list for each camera, in which the list contains data of unidentified objects; the subject; and identified feature(s) on the subject for each camera. Specifically, step S120 is executed to obtain camera images in real-time (or near real-time). Three dimensional models of the monitored subject is maintained in the temporary storage device (e.g., RAM) 27 of the computer 25. Then, an operation to identify the subject is initiated (step S122). In the disclosed embodiments, this is accomplished by noting features on the subject and determining whether they are found very close to where the subject was last located. If they are found, the three dimensional model is updated. However, if only one camera presently sees the subject, a two dimensional model is constructed.

At step S124, the most easily observable features on the subject are updated. Finally, any unexpected objects that are in the monitored volume are modeled and tracked (step S126). Unexpected objects are considered to be unknown objects because their properties are not known. However, these objects will be identified once they enter the monitored volume. Therefore, three dimensional and two dimensional models are built for them as if they were subjects (which they may possibly turn out to be). This completes the operation of the Image Analysis subroutine.

The foregoing discussion has been provided merely for the purpose of explanation and is in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent strictures, methods and uses, such as are within the scope of the appended claims. The invention described herein comprise dedicated hardware implementations including, but not limited to, application specific integrated circuits, programmable logic arrays and other hardware devices constructed to implement the invention described herein. However, it is understood that alternative software implementations including, but not limited to, distributed processing, distributed switching, or component/object distributed processing, parallel processing, or virtual machine processing can also be constructed to implement the invention described herein.

We claim:

1. An apparatus for monitoring an orientation of a subject in a predetermined volume, comprising:
an image capture device that captures an image of the predetermined volume;
a processing device that processes said captured image of the predetermined volume to produce a three-dimensional model that is analyzed for indications that a predetermined feature of the subject in the three-dimensional model of the predetermined volume is within a certain range of dimensional limits corresponding to a fallen subject; and
a notification device that provides a notification when the processing device determines that said predetermined feature of the subject represents the fallen subject.

2. The apparatus of claim 1, further comprising an audio capture device that captures sounds emitted by the subject.

3. The apparatus of claim 2, wherein said processing device additionally analyzes said emitted sounds to derive cues pertaining to a position of the subject.

4. The apparatus of claim 3, wherein said processing device derives said cues from at least one of a voice recognition of said emitted sounds and a voice stress analysis of said emitted sounds.

5. The apparatus of claim 1, wherein said predetermined feature of the subject comprises at least one of a face and a waist.

6. The apparatus of claim 1, wherein said notification device and said processing device are located in different locations.

7. The apparatus of claim 1, wherein said processing device analyzes past movements of the subject in said predetermined volume to anticipate a fallen condition of the subject.

8. The apparatus of claim 1, wherein said image capture device comprises a stereoscopic sensor.

9. The apparatus of claim 1, wherein said image capture device comprises a plurality of sensors.

10. The apparatus of claim 1, further comprising a visual display device that provides a visual image of the subject when said notification device provides said notification that said predetermined feature of the subject represents the fallen subject.

11. The apparatus of claim 10, wherein at least one of the notification device and said visual display device additionally provides supplemental information related to the fallen subject.

12. The apparatus of claim 1, wherein said notification device provides an intruder notification when said processing device determines that a non-authorized subject has entered said predetermined volume.

13. The apparatus of claim 1, further comprising a pattern generator that irradiates at least a substantially featureless portion of the predetermined volume with a distinctive marking that assists said processing device in determining a three-dimensional position of the subject in said three-dimensional model.

14. A method for monitoring an orientation of an subject in a predetermined volume, comprising:
capturing an image of the predetermined volume;
processing the captured image of the predetermined volume to produce a three-dimensional model that is analyzed for indications that a predetermined feature of the subject in the three-dimensional model of the predetermined volume is within a certain range of dimensional limits corresponding to a fallen subject; and
providing a notification when the predetermined feature of the subject is determined to correspond to the fallen subject.

15. The method of claim 14, further comprising capturing sounds emitted by the subject.

16. The method of claim 15, further comprising analyzing the emitted sounds to derive cues pertaining to the position of the subject.

17. The method of claim 16, wherein analyzing the emitted sounds comprises deriving the cues from at least one of a voice recognition of the emitted sounds and a voice stress analysis of the emitted sounds.

18. The method of claim 14, wherein the predetermined feature comprises at least one of a face and a waist of the subject.

19. The method of claim 14, further comprising analyzing past movements of the subject in the volume to anticipate a fallen condition of the subject.

20. The method of claim 14, wherein capturing an image comprises using a stereoscopic sensor to capture an image of the predetermined volume.

21. The method of claim 14, wherein capturing an image comprises using a plurality of sensors to capture an image of the predetermined volume.

22. The method of claim 14, further comprising providing a visual image of the subject when the subject is determined to be substantially horizontal.

23. The method of claim 22, further comprising providing supplemental information related to the subject.

24. The method of claim 14, further comprising providing a notification when a non-authorized subject is determined to have entered the predetermined volume.

25. The method of claim 14, wherein providing a notification comprises providing a verbal notification.

26. The method of claim 14, further comprising:
enabling a verbal communication with the subject when the notification has been provided; and
enabling the subject to respond to the verbal communication.

27. The method of claim 26, wherein enabling the subject to respond to the verbal communication allows the subject to modify the notification.

28. The method of claim 14, further comprising irradiating at least a substantially featureless portion of the predetermined volume with a distinctive marking that assists in the analysis of indications that the subject is within the certain range of dimensional limits corresponding to the fallen subject by determining a three-dimensional position of the subject in the three-dimensional model.

* * * * *